United States Patent [19]
Lee

[11] Patent Number: 5,832,236
[45] Date of Patent: Nov. 3, 1998

[54] HIGH SPEED FRAME TRANSLATION FOR COMPUTER NETWORKS

[75] Inventor: Paul Kakui Lee, Union City, Calif.

[73] Assignee: Compaq Computer Corporation, Houston, Tex.

[21] Appl. No.: 650,949

[22] Filed: May 20, 1996

[51] Int. Cl.[6] .................................................. G06F 17/00
[52] U.S. Cl. ...................................................... 395/200.79
[58] Field of Search ......................... 395/200.79, 200.66, 395/200.76

[56] References Cited

U.S. PATENT DOCUMENTS

| | | | |
|---|---|---|---|
| 5,432,907 | 7/1995 | Picazo, Jr. et al. ...................... | 395/200 |
| 5,490,252 | 2/1996 | Macera et al. ...................... | 395/200.01 |
| 5,560,038 | 9/1996 | Haddock ............................ | 395/200.66 |
| 5,623,605 | 4/1997 | Keshav et al. ...................... | 395/200.66 |

OTHER PUBLICATIONS

Information Sciences Institute, "rfc791 Internet Protocol–DARPA Internet Program Protocol Specification", University of Southern California, Sep. 1981.

*Primary Examiner*—Ellis B. Ramirez
*Attorney, Agent, or Firm*—Beyer & Weaver, LLP

[57] ABSTRACT

A high-speed, hardware based translation system for translating frames from one frame format to another frame format is disclosed. According to one embodiment, the frame translation system for translating a frame associated with a computer network from a first format to a second format includes a storage buffer for temporarily storing the frame of the first format; and a format translator for retrieving portions of the frame in the first format from said storage buffer, identifying the second format from at least one of the retrieved portions of the frame in the first format, and outputting portions of the frame in the second format. The frame translation system may also include a counter for counting a length of the frame in the first format. The translation system according to the invention can translate frames of incoming data to another format at a rate of greater than 150k frames/seconds. As a result, the translation system is well suited for high speed networks, such as an FDDI network, wherein bursts of data which can be received at a rate of about 150k frames/second.

33 Claims, 12 Drawing Sheets

HIGH SPEED FRAME TRANSLATION FOR COMPUTER NETWORKS

BACKGROUND OF THE INVENTION

1. Field of the Invention

The present invention relates to networks and, more particularly, to frame translation between different types of networks.

2. Description of the Related Art

A computer network includes a number of computing devices (e.g., computers) that are connected together for the purpose of resource sharing and exchange of information. Often a computer network includes a number of computers which are coupled together to form a larger logical network. Typically, the computer networks also couple other data devices besides computers, namely printers, modems and the like. To create flexible computer networks, it is necessary to interconnect individual computer networks such as Local Area Networks (LANs) and Wide Area Networks (WANs).

There are a number of different types of devices that can be used to accomplish the various interconnections. These devices include repeaters, bridges, routers, switches and converters. A repeater receives frames of data from one cable segment and transmits them to another cable segment after regenerating the frames. A bridge also forwards frames, but bridges are more flexible and intelligent than repeaters. In particular, a bridge interconnects network datalinks, whereas a repeater connects cable segments. A router operates to route messages or frames from one network system to another network system when there are multiple paths to choose from. A switch limits the degree of sharing of a common communication medium. That is, a switch forwards frames from one network datalink to one of a plurality of other network datalinks. In essence, a switch is a bridge with many ports. Bridges or switches operate at the Media Access Control (MAC) layer, whereas the router operates at the Network layer. A converter (e.g., gateway) allows networks with different network architectures to interoperate.

Ethernet is a common communications standard used for computer networks, particularly LANs. Traditional Ethernet operates at a transmission rate of 10 megabits per second (Mbps), but a later, faster version known as Fast Ethernet operates at a transmission rate of 100 Mbps. Both Ethernet and Fast Ethernet have standards that limit, among other things, the length of the physical interconnection medium, the number of stations and the number of repeaters.

FDDI is a set of standards developed by the American National Standards Institute's (ANSI), Accredited Standards Committee (ASC), Task Group X3T9.5. FDDI uses a timed token access method to share the physical interconnection medium (namely, a fiber optics cable) among stations attached to the FDDI network. The FDDI network can have a maximum of 500 stations, and the maximum length of the fiber cable between two successive stations is 2 km. The maximum allowed length of the medium in the network is 200 km. Packets on FDDI are called frames and have a maximum frame size of 4500 bytes.

In terms of higher layer protocols, FDDI is somewhat compatible with IEEE 802 standards, such as CSMA/CD (IEEE 802.3, loosely called Ethernet), token rings (IEEE 802.5), and token bus (IEEE 802.4). Thus, applications running on these standards can be made to work over FDDI without major changes to upper layer software. The advantages of FDDI are higher bandwidth on the order of 100 Mbps, longer interstation distance, larger extent of the network, larger number of nodes, and access time guarantee. Nevertheless, the frame formats for different standards are different.

A backbone network is commonly used to connect several networks. FDDI is particularly suitable for use as a backbone network to connect FDDI to LANs such as IEEE 802.3/Ethernet and/or IEEE 802.5/token ring networks. However, when different network types are being interconnected by a backbone network, it is necessary to translate the frames from one frame format to another network frame format. For example, if the backbone network is FDDI and it connects to IEEE 802.3/Ethernet networks, the frames being transmitted must be translated for proper operation. The conventional frame translation is performed using software. See, Raj Jain, "FDDI Handbook—High-Speed Networking Using Fiber and Other Media," Addison-Wesley, 1994, pp. 298–300.

One problem is that the conventional software techniques cannot perform the translation of the frames fast enough to keep up with the high speed of FDDI. The problem is most severe during bursts of FDDI frames which can be received at a rate of about 150k frames/second, since conventional software approaches can only translate at a rate of about 30k frames/second. Consequently, during bursts of FDDI frames, the conventional software techniques for translation of frames cannot keep up with the rapid rate in which the frames are received. Hence, in this case, many of the incoming FDDI frames are dropped or lost, thereby reducing efficiency and performance of the network.

Thus, there is a need for improved frame translation techniques which are able to translate frames from one frame format to another format at higher speeds than conventionally available so that the frame translation does not negatively impact network performance.

SUMMARY OF THE INVENTION

Broadly speaking, the invention is a high-speed, hardware based translation system for translating frames from one frame format to another frame format. The translation system according to the invention can translate frames of incoming data to another format at a rate of greater than 150k frames/seconds. As a result, the translation system is well suited for high speed networks, such as an FDDI network, wherein bursts of data which can be received at a rate of about 150k frames/second.

The invention can be implemented in numerous ways, including as a system or apparatus. The invention can also be utilized in a variety of different network interconnection devices, including switches, routers, bridges and hubs. Several embodiments of the invention are described below.

A frame translation system for translating a frame associated with a computer network from a first format to a second format according to one embodiment of the invention includes: a storage buffer for temporarily storing the frame in the first format; a counter for counting a length of the frame in the first format; a format translator for retrieving portions of the frame in the first format from said storage buffer, identifying the second format from at least one of the retrieved portions of the frame in the first format, and outputting portions of the frame in the second format based on at least one of the length and the retrieved portions of the frame in the first format.

A frame translation system for translating a frame associated with a computer network from a first format to a second format according to another embodiment includes: a storage buffer for temporarily storing the frame in the first format; a format translator for retrieving portions of the frame in the first format from said storage buffer, identifying the second format from at least one of the retrieved portions of the frame in the first format, and outputting portions of the frame in the second format based on at least one of a predetermined code portion and the retrieved portions of the frame in the first format.

A network connection apparatus according to one embodiment of the invention includes: an input port for receiving a FDDI frame; a FDDI interface controller for controlling receipt of a data stream associated with the FDDI frame, the FDDI frame being one of a control FDDI frame and a data FDDI frame; a control buffer for storing data associated with at least one control FDDI frame; a data buffer for storing data associated with at least one data FDDI frame; a first buffer manager for managing the storing of the FDDI frame to the appropriate one of said control buffer and said data buffer, determining a length of the FDDI frame, storing the length in said data buffer, determining whether the data FDDI frame is ready to be dispatched, and dispatching the data FDDI frame from said data buffer after the data FDDI frame is determined to be ready to be dispatched; a processor for processing the control FDDI frame stored in said control buffer; a frame format translator for translating the data FDDI frame to an Ethernet type frame; and a first output port for outputting the Ethernet type frame. Preferably, the frame format translator retrieves portions of the FDDI frame from said data buffer, identifies the Ethernet type format from at least one of the retrieved portions of the FDDI frame, and outputs portions of the Ethernet type frame based on at least one of the length and the retrieved portions of the FDDI frame.

A network connection apparatus according to another embodiment of the invention includes: an input port for receiving an Ethernet type frame; a buffer for storing data associated with at least one the Ethernet type frame; a buffer manager for managing the storing of the Ethernet type frame to said buffer, determining whether the Ethernet type frame is ready to be dispatched, and dispatching the Ethernet type frame from said buffer after the Ethernet type frame is determined to be ready to be dispatched; a frame format translator for translating the Ethernet type frame to a data FDDI frame; a FDDI interface controller for controlling transmission of a data stream associated with the data FDDI frame; and a first output port for outputting the data FDDI frame. Preferably, the frame format translator retrieves portions of the Ethernet type frame from said buffer, identifies the Ethernet type frame format from at least one of the retrieved portions of the Ethernet type frame, and outputs portions of the data FDDI frame based on at least one of predetermined codes and the retrieved portions of the Ethernet type frame.

The advantages of the invention are numerous. The frame translation performed in accordance with the invention is substantially faster than conventionally possible, and fast enough to support FDDI and other high speed data transmission standards for computer networks. Hence, even in situations were a burst of FDDI is received, the translation between frame formats is achieved in near real-time without any loss of frames. The frame translation performed by the invention also supports translation between a plurality of different frame formats. Thus, with any given frame, the frame translation performed can be different.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

Embodiments of the invention are discussed below with reference to FIGS. 1–9. However, those skilled in the art will readily appreciate that the detailed description given herein with respect to these figures is for explanatory purposes as the invention extends beyond these limited embodiments.

The invention relates to a high-speed, hardware based translation system for translating frames from one frame format to another frame format. A frame is an informal name for a protocol-data-unit (PDU). A PDU is data unit that a layer or sublayer entity transmits across a network to a peer layer or sublayer entity. The hardware translation system can be utilized in a variety of different network interconnection devices, including switches, routers, bridges and hubs. The detailed discussion of the invention provided below is with reference to a switch implementation of the hardware translation system.

Figure 1:
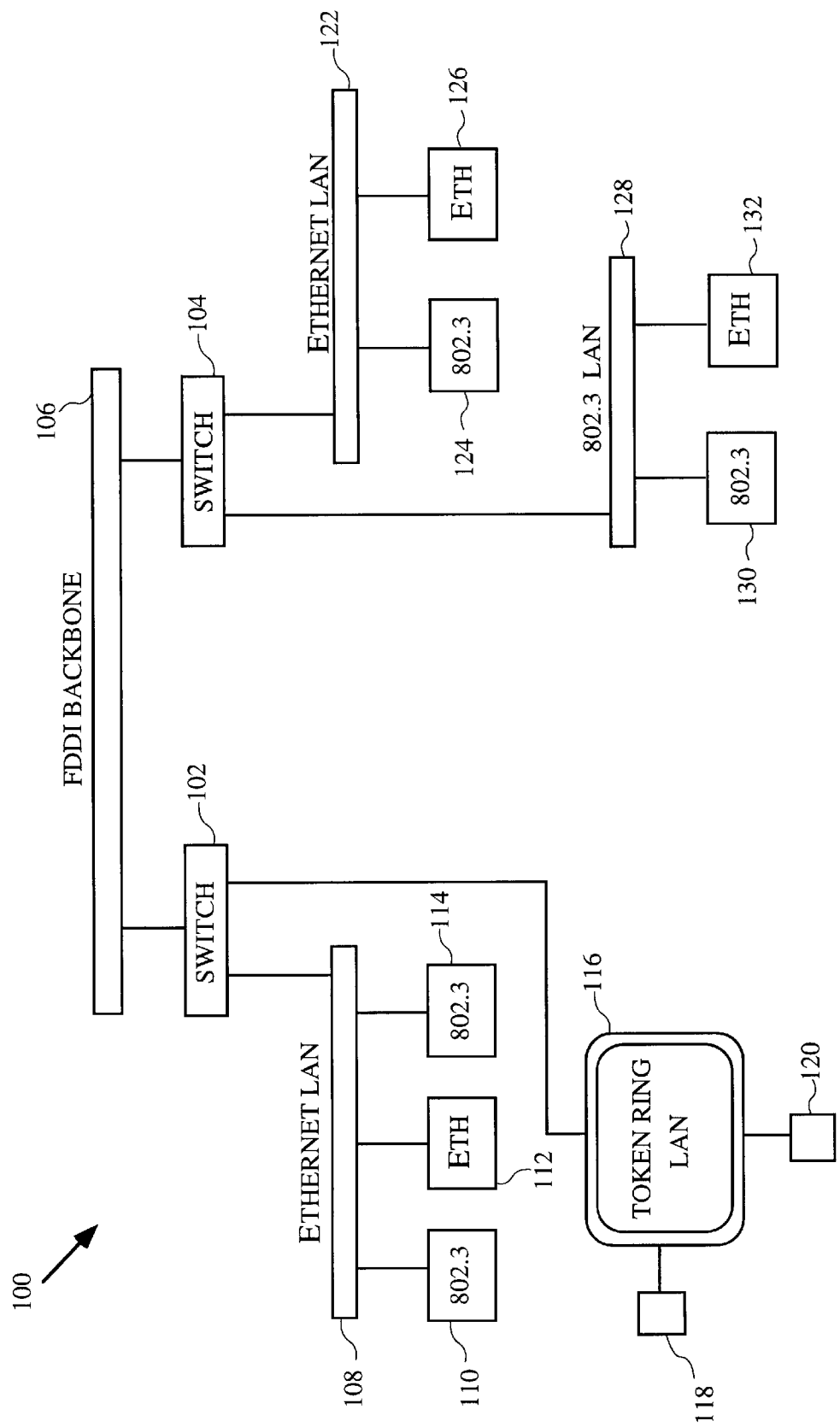
FIG. 1 is a schematic block diagram of an exemplary network that incorporates the invention.

FIG. 1 is a schematic block diagram of an exemplary network 100. The network 100 is a computer network which includes switches 102 and 104 that incorporate the high-speed hardware based translation system according to the invention. The switches 102 and 104 are interconnected by a FDDI backbone network 106.

The switch 102 has multiple input ports which receive links to other networks. Specifically, one of the input ports of the switch 102 is coupled to an Ethernet Local Area Network (LAN) 108. Ethernet standards involve various different varieties. Regardless of the variety, the physical network is the same. However, at the Media Access Control (MAC) layer, the different varieties have different MAC frame formats (hereafter simply frame formats). When the term "Ethernet" is used generally it can refer to any of these varieties. Two varieties of Ethernet having different frame formats are discussed below. The first is referred to as original Ethernet (sometimes referred to as Ethernet) and the second variety is Ethernet 802.3. The Ethernet LAN 108 is a local network for the devices 110, 112 and 114. In this exemplary network 100, the devices 110 and 114 use the Ethernet 802.3 standard and the device 112 uses the original Ethernet standard. Although both the original Ethernet standard and the Ethernet 802.3 Ethernet standard can coexist over the same network, the devices coupled to the network are configured to understand only one of the standards. A token ring LAN 116 is coupled to another port of the switch 102. The token ring LAN 116 is a local network for devices 118 and 120. The devices 118 and 120 use the Token Ring 802.5 standard which is another LAN standard. However, the Token Ring 802.5 standard is not an Ethernet standard.

The switch 104 includes multiple input ports which receive links to other networks. One of the input ports of the switch 104 is coupled to an Ethernet LAN 122. The Ethernet LAN 122 is a local network for devices 124 and 126. The device 124 uses the Ethernet 802.3 protocol, and the device 126 uses the original Ethernet protocol. The switch 104 has another input port coupled to an Ethernet LAN 128. The Ethernet LAN 128 is a local network for devices 130 and 132. The device 130 uses the Ethernet 802.3 protocol, and the device 132 uses the original Ethernet protocol.

The devices 110–114, 118, 120, 124, 126, 130, and 132 are typically computers, such as personal computers, workstation computers, minicomputers or mainframe computers. The computers may operate as general purpose computing devices or may be computing devices dedicated to certain network operations. An example of a computing device that is dedicated to network operations is a server.

Figure 2:
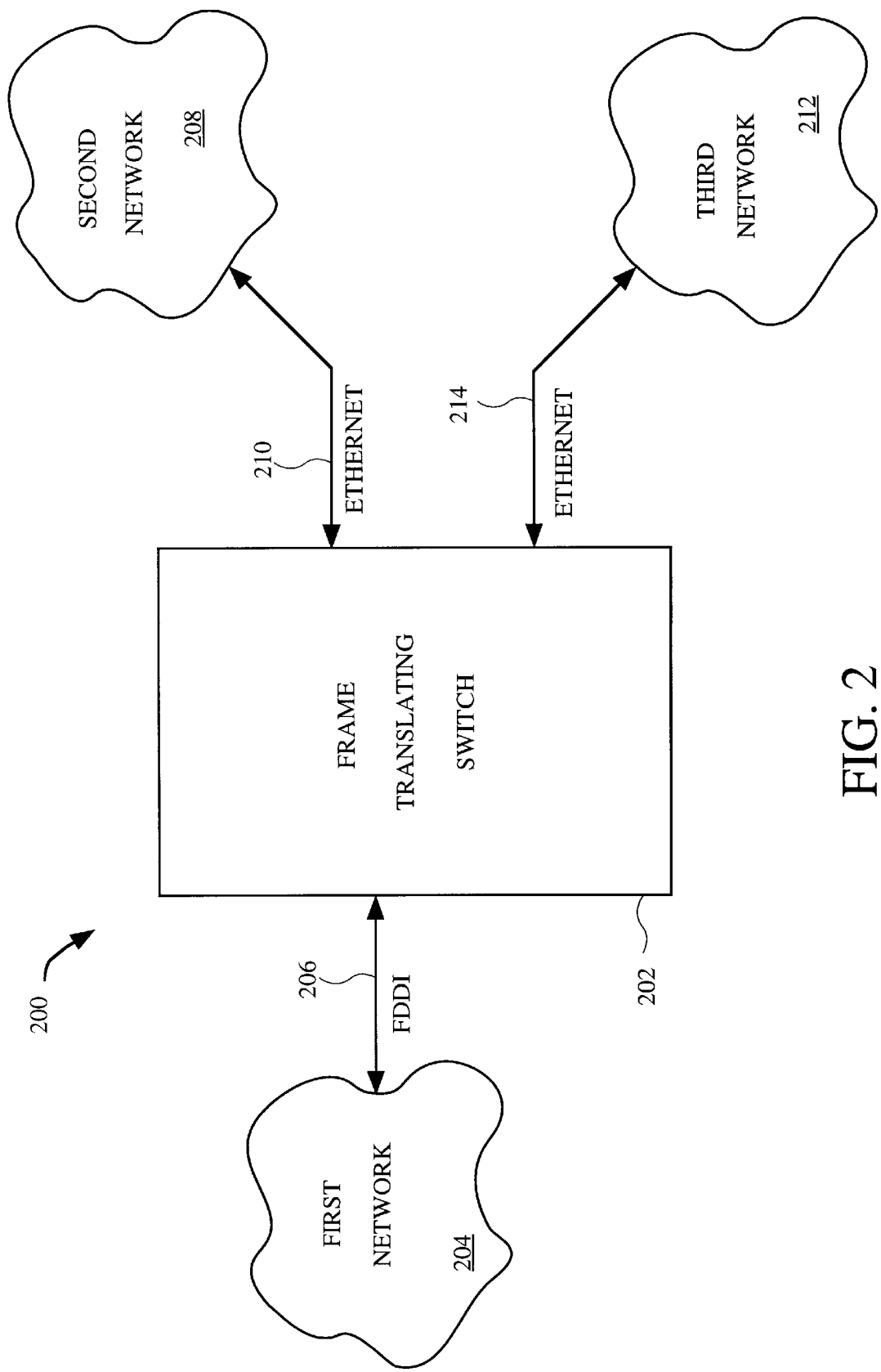
FIG. 2 is a diagram of a switching system according to a first embodiment of the invention.

FIG. 2 is a diagram of a switching system 200 according to a first embodiment of the invention. The switching system 200 includes a frame translating switch 202. The frame translating switch 202 operates to connect physical transmission media of several otherwise isolated networks. Specifically, a first port of the frame translating switch 202 is coupled to a physical transmission medium of a first network 204 by an interconnection link 206. In the implementation of the switching system 200 illustrated in FIG. 2, the physical transmission medium and the interconnection link 206 associated with the first network 204 utilize the FDDI frame format. A second port of the frame translating switch 202 is coupled to a second physical transmission medium of a second network 208 using an interconnection link 210. The physical transmission medium and the link 210 associated with the second network 208 utilize an Ethernet frame format. A third port of the frame translating switch 202 is coupled to a physical transmission medium of a third network 212 using an interconnection link 214. The third physical transmission medium and the interconnection link 214 also utilizes an Ethernet frame format. The second and third networks 208 and 212 are thus Ethernet networks and each of which can have devices coupled thereto that use the original Ethernet frame format or the 802.3 frame format, or both. As an example, the first network 204 could be associated with a FDDI backbone network such as the FDDI backbone network 106 illustrated in FIG. 1, the second network 208 could be associated with an Ethernet LAN network such as the Ethernet LAN 122 illustrated in FIG. 1, and the third network 212 could be associated with an Ethernet LAN such as the Ethernet LAN 128 illustrated in FIG. 1.

The frame translating switch 202 operates to interconnect the first network 204 to either the second network 208 or the third network 212 via the links 206, 210 and 214. Hence, at any given point in time, only one of the second network 208 and the third network 212 is coupled to the first network 204 via the frame translating switch 202. However, because the frame formats between the different networks being interconnected by the frame translating switch 202 differ, the frame formats must be properly translated for their respective networks.

When the frame translating switch 202 connects the first network 204 to the second network 208 via the links 206 and 210, each frame traversing from the second network 208 to the first network 204 must be translated from the Ethernet frame format to the FDDI frame format. The frame translating switch 202 then forwards the translated frame to the first network 204 through the interconnection link 206. In the reverse direction, the frame translating switch 202 converts each frame traversing from the first network 204 to the second network 208 must be translated from the FDDI frame format to the Ethernet frame format for use by the second network 208.

Likewise, when the frame translating switch 202 connects the first network 204 to the third network 212 via the links 206 and 214, each frame traversing from the third network 212 to the first network 204 must be translated from the Ethernet frame format to the FDDI frame format. The frame translating switch 202 then forwards the translated frame to the first network 204 through the interconnection link 206. In the reverse direction, the frame translating switch 202 converts each frame traversing from the first network 204 to the third network 212 must be translated from the FDDI frame format to the Ethernet frame format for use by the third network 212.

During translation from the Ethernet frame format to the FDDI frame format as well as from the FDDI frame format to the Ethernet frame format, the frame translating switch 202 has to perform several different translations. The translations performed by the frame translating switch 202 of the first embodiment of the switching system 200 are as follows:

1. FDDI to 802.3 IPX
2. FDDI to 802.3 non-IPX
3. FDDI to Ethernet (original Ethernet)
4. 802.3 IPX to FDDI
5. 802.3 non-IPX to FDDI
6. Ethernet (original Ethernet) to FDDI Note that 802.3 IPX and 802.3 non-IPX have different frame formats but are both more generally grouped under the 802.3 frame format. IPX refers to Internet Packet Exchange protocol. The performance of these translation operations according to the invention is described in detail below.

Figure 3:
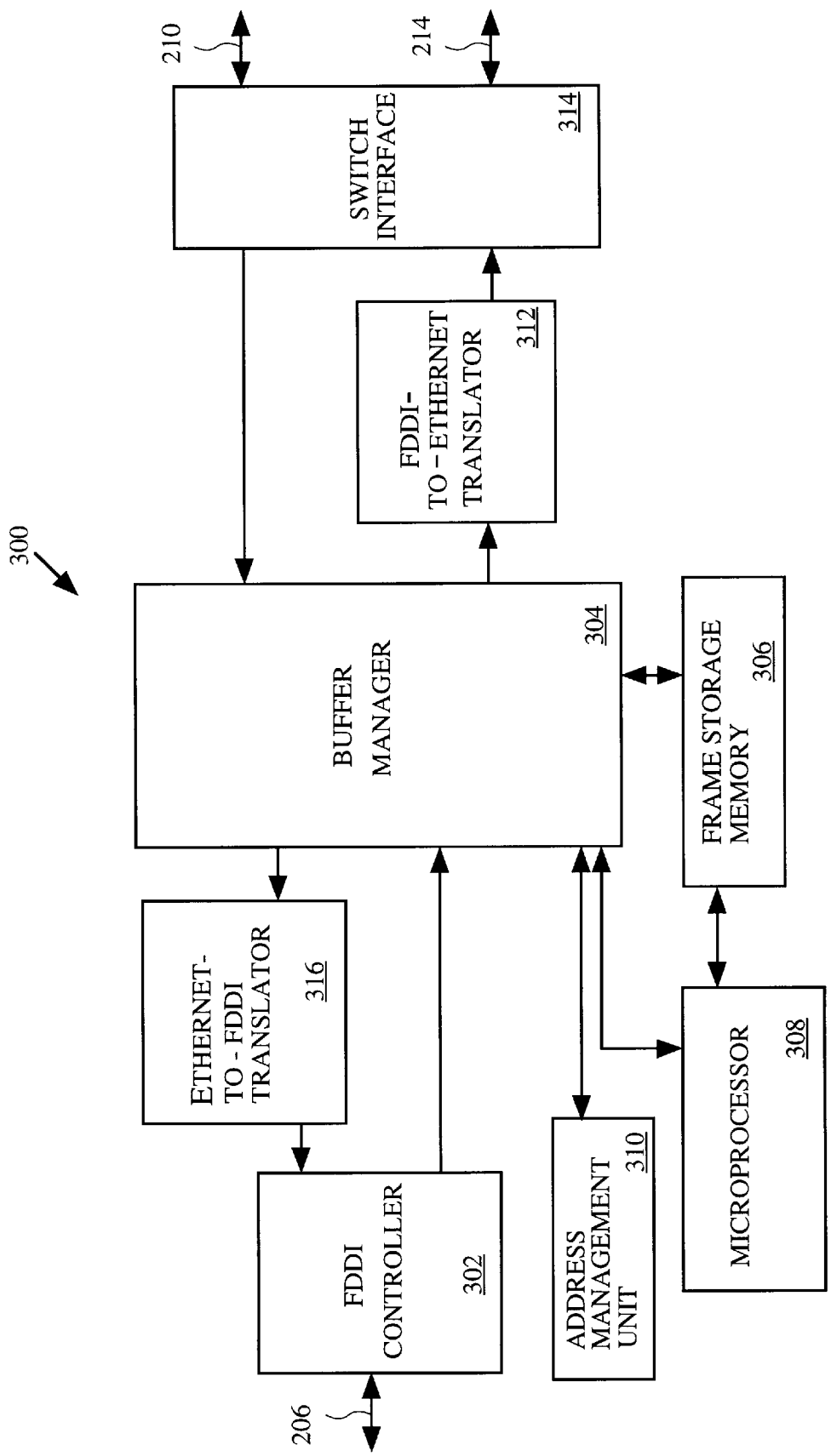
FIG. 3 is a block diagram of a frame translating switch according to an embodiment of the invention.

FIG. 3 is a block diagram of a frame translating switch 300 according to an embodiment of the invention. The frame translating switch 300 illustrated in FIG. 3 is a detailed diagram of a frame translating switch that can be used as the frame translating switch 202 illustrated in FIG. 2.

The frame translating switch 300 includes a FDDI controller 302 which receives and sends FDDI frames over the interconnection link 206. The FDDI controller 302 is preferably a standard FDDI controller or interface chip such as Motorola MC68848 CAMEL. A FDDI frame received at the FDDI controller 302 is forwarded to a buffer manager 304 as it comes in via the interconnection link 206. The buffer manager 304 does various preprocessing functions associated with translation operations to be performed by the frame translating switch 300. In this illustrated embodiment, the buffer manager 304 also performs some traditional operations associated with the switching function (namely, forward or filtering decision, separating data and management traffic, etc.). The buffer manager 304 interacts closely with a frame storage memory 306. The frame storage memory 306 stores at least one of the incoming FDDI frames. The incoming FDDI frame being stored in the frame storage memory 306 is identified as one of a control frame and a data frame. A microprocessor 308 is also provided in the frame translating switch 300 to perform various operations, including checking the incoming data for corruption and performing network management functions (such as processing the control frames). The microprocessor 308 can communicate with the buffer manager 304 and can retrieve and store information from and to the frame storage memory 306.

More particularly, buffer manager 304 operates to determine the length of the incoming FDDI frame, store the FDDI frame in the frame storage memory 306, and set various flags for other functional blocks within the frame translating switch 300. The incoming FDDI frames can be either control frames or data frames. One of the flags is used by the buffer manager 304 to signal the microprocessor 308 that a complete control frame for network management processing resides within the frame storage memory 306. Once the appropriate flag indicates that a complete control frame is stored within the frame storage memory 306, the microprocessor 308 is able to process the control frame. Another one of the flags is used by the buffer manager 304 to indicate that a complete data frame is stored within the frame storage memory 306. Once the appropriate flag indicates that a complete data frame is stored within the frame storage memory 306, the data frame is ready to be translated by a frame format translator and then forwarded to the appropriate output port of the frame translating switch 300.

The frame translating switch 300 also includes an address management unit 310. The address management unit 310 operates to direct the incoming frame to the appropriate port on the frame translating switch 300 (namely, interconnection links 210 and 214). The address management unit 310 is preferably included in the frame translating switch 300 because it assists with translation and switching operations. Preferably, the address management unit 310 (i) filters out (drops) those frames that do not actually need forwarding through the frame translating switch 300 to other networks, and (ii) indicates the particular frame translation, if any, required based on the destination port.

When using this embodiment of the frame translating switch 300 as the frame translating switch 200 in FIG. 2 and after receiving a FDDI data frame, the frame format translator is a FDDI-to-Ethernet translator 312 because the frame translating switch 300 is placed between the first network 204 which is an FDDI network and the second and third networks 208 and 212 which are two different types of Ethernet networks. Hence, the FDDI data frame stored in the frame storage memory 306 is forwarded by the buffer manager 304 to the FDDI-to-Ethernet translator 312. The FDDI-to-Ethernet translator 312 translates the FDDI frame to an Ethernet frame at a very high speed using hardware circuitry. The translation speed provided by the hardware circuitry is capable of translating frames of incoming data to another format at a rate of greater than 150k frames/second, thus exceeding the burst rate of receiving data over FDDI. The translated frame is then sent to a switch interface 318 which couples the translated frame to the interconnection link 210 of the second network 208 or the interconnection link 214 of the third network 212. The frame translating switch 300 also receives data from the first and second networks 208 and 212 (via the interconnection links 210 and 214) which are to be forwarded to the network 204 (via the interconnection link 206) after translation from the Ethernet protocol to the FDDI protocol. In this case, the received Ethernet frame is passed by the switch interface 314 to the buffer manager 304. The buffer manager 304 stores the received Ethernet frame in the frame storage memory 306 then, once the Ethernet frame is stored by the buffer manager 304, the stored Ethernet frame which are data frames are then forwarded word-by-word from the frame storage memory to a frame format translator. In this case, the frame format translator is an Ethernet-to-FDDI translator 316. The Ethernet-to-FDDI translator 316 translates the Ethernet data frame to a FDDI frame using high-speed hardware circuitry. After the Ethernet data frame is translated to a FDDI frame, the resulting FDDI frame is forwarded to the FDDI controller 302 where it is processed and transmitted over the interconnection link 206 of the first network 204 in a conventional manner.

Figure 4A:
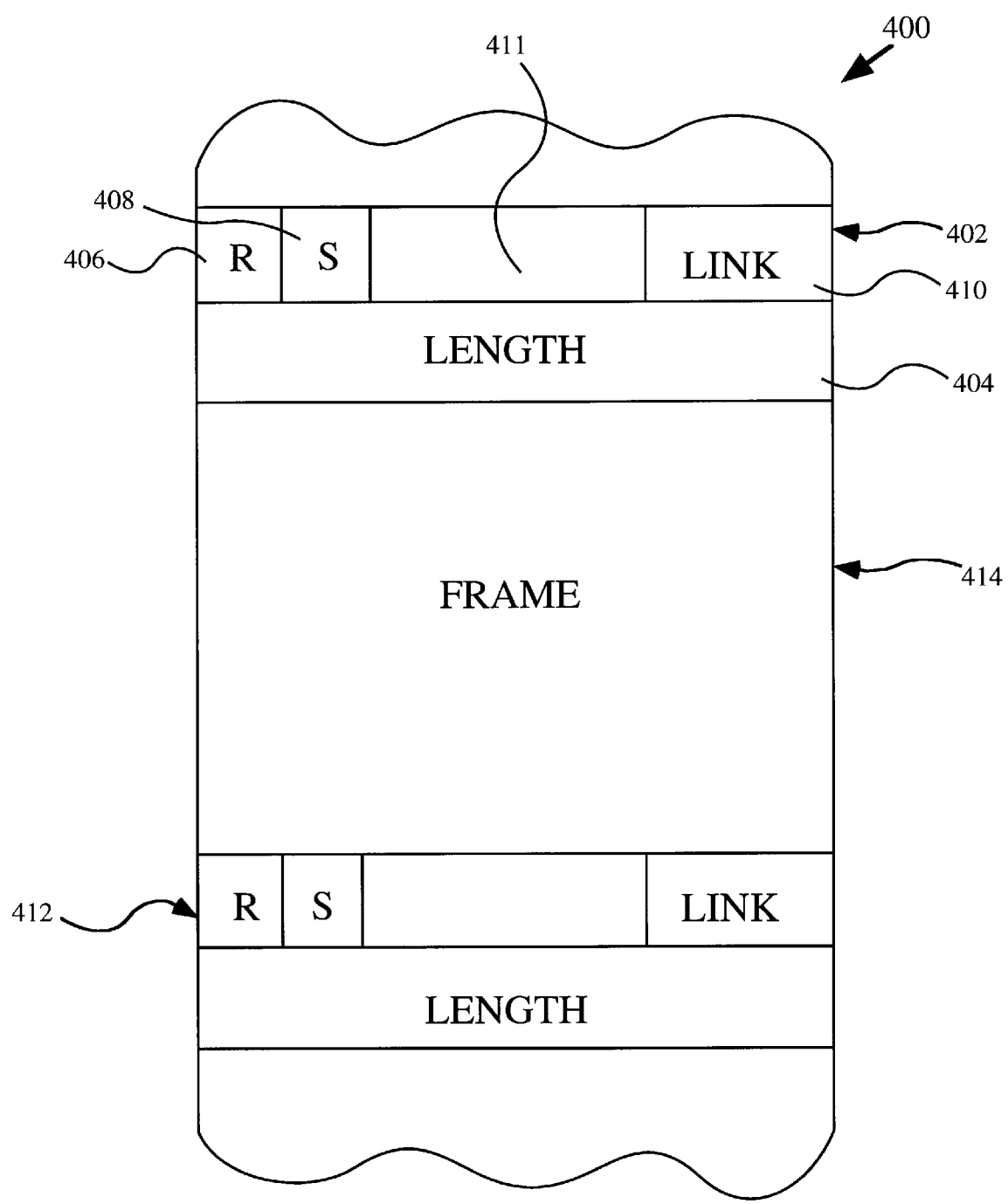
FIG. 4A illustrates an exemplary data structure for storage of data in a data buffer of the frame translating switch illustrated in FIG. 3.

FIG. 4A illustrates a data structure 400 that is preferably stored in the frame store memory 308. The data structure 400 begins with a translation header consisting of a first word 402 and a second word 404. The first word 402 includes a ready flag (R) 406, a skip flag (S) 408, a link 410, and a reserved area 411. The ready flag (R) 406 indicates whether the frame is entirely stored within the frame storage memory 306 and ready to be translated. The skip flag (S) 408 indicates whether the frame stored in the frame storage memory 306 should be completely skipped. The frame stored in the frame storage memory 306 is skipped (i.e., meaning not translated) because the frame to be filtered per MAC address, or the frame has attributes that violate the destination LAN standard (e.g., the frame is too large and cannot be fragmented), or the frame is determined to be bad (e.g., bad CRC or bad checksum). The link 410 is a pointer to a first word 412 in the translation header for the next frame wholly or partly stored in the data buffer 408. The second word 404 in the translation header stores the length (e.g., number of bytes) of the incoming frame as determined by the buffer manager 304. The data structure 400 is particularly suited for frame translations in either direction, but the length stored in the second word 404 is particularly required for translation from FDDI frames to Ethernet/802.3 frames where the length must be added into the translated frame. A frame portion 414 of the data structure 400 stores the frame that is to be translated and switched (or processed in the case of a control frame). The frame portion 414 sequentially follows in the frame storage memory the first and second words 402 and 404 of the translation header.

Figure 4B:
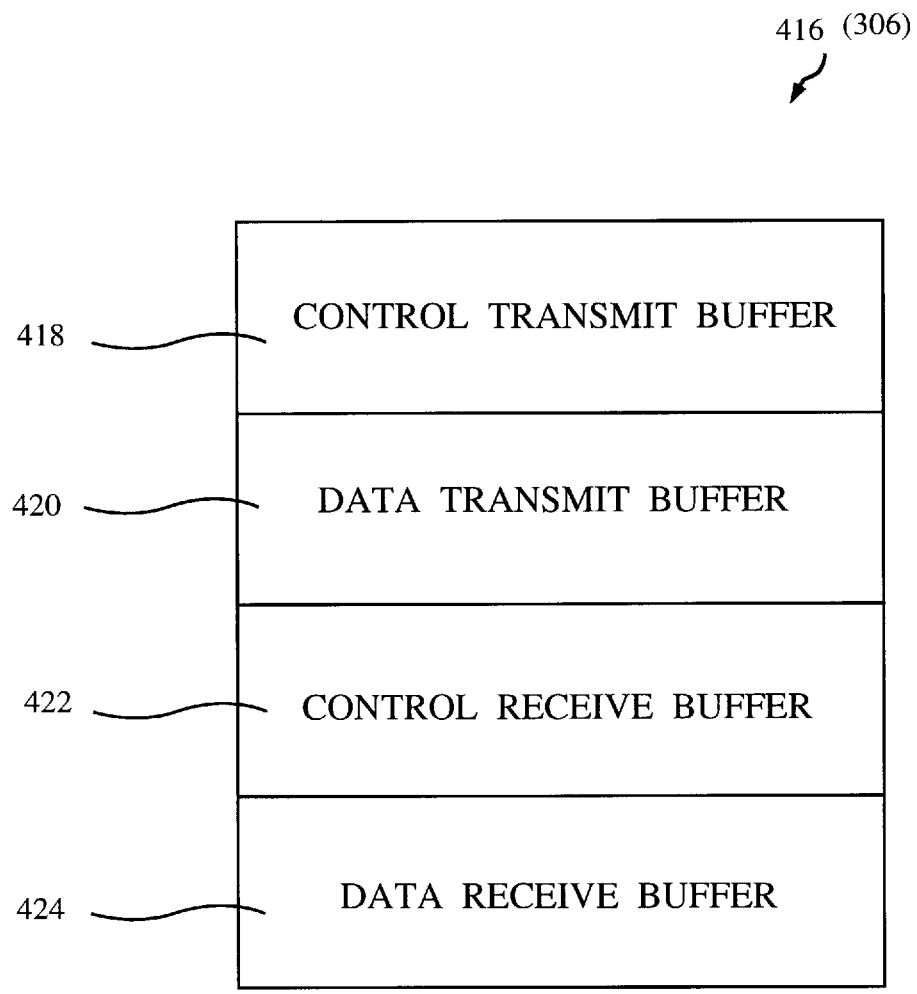
FIG. 4B is a diagram of a frame storage memory according to a preferred embodiment of the invention.

FIG. 4B is a diagram of a frame storage memory 416 according to a preferred embodiment of the invention. The frame storage memory 416 illustrated in FIG. 4B is a preferred implementation of the frame storage memory 306 in FIG. 3. The frame storage memory 416 is a Random-Access Memory (RAM) that is partitioned to form separate circular buffers. In particular, the frame storage memory 416 is partitioned into a control transmit buffer 418, a data transmit buffer 420, a control receive buffer 422, and a data receive buffer 424. Each of the buffers 418–424 is effectively a separate circular buffer. Preferably, the date or control information stored in the buffers 418–424 is stored in accordance with the data structure 400 illustrated in FIG. 4A.

When the frame received is a FDDI frame from the first network 204, the buffer manager 304 causes the FDDI frame to be stored in the control receive buffer 422 if it pertains to network management control, or to be stored in the data receive buffer 424 if it pertains to data. On the other hand, when the frame received is an Ethernet frame from the second network 208 or the third network 212, the buffer manager 304 causes the Ethernet frame to be stored in the control transmit buffer 418 if it pertains to network management control, or to be stored in the data transmit buffer 420 if it pertains to data.

Figure 5A:
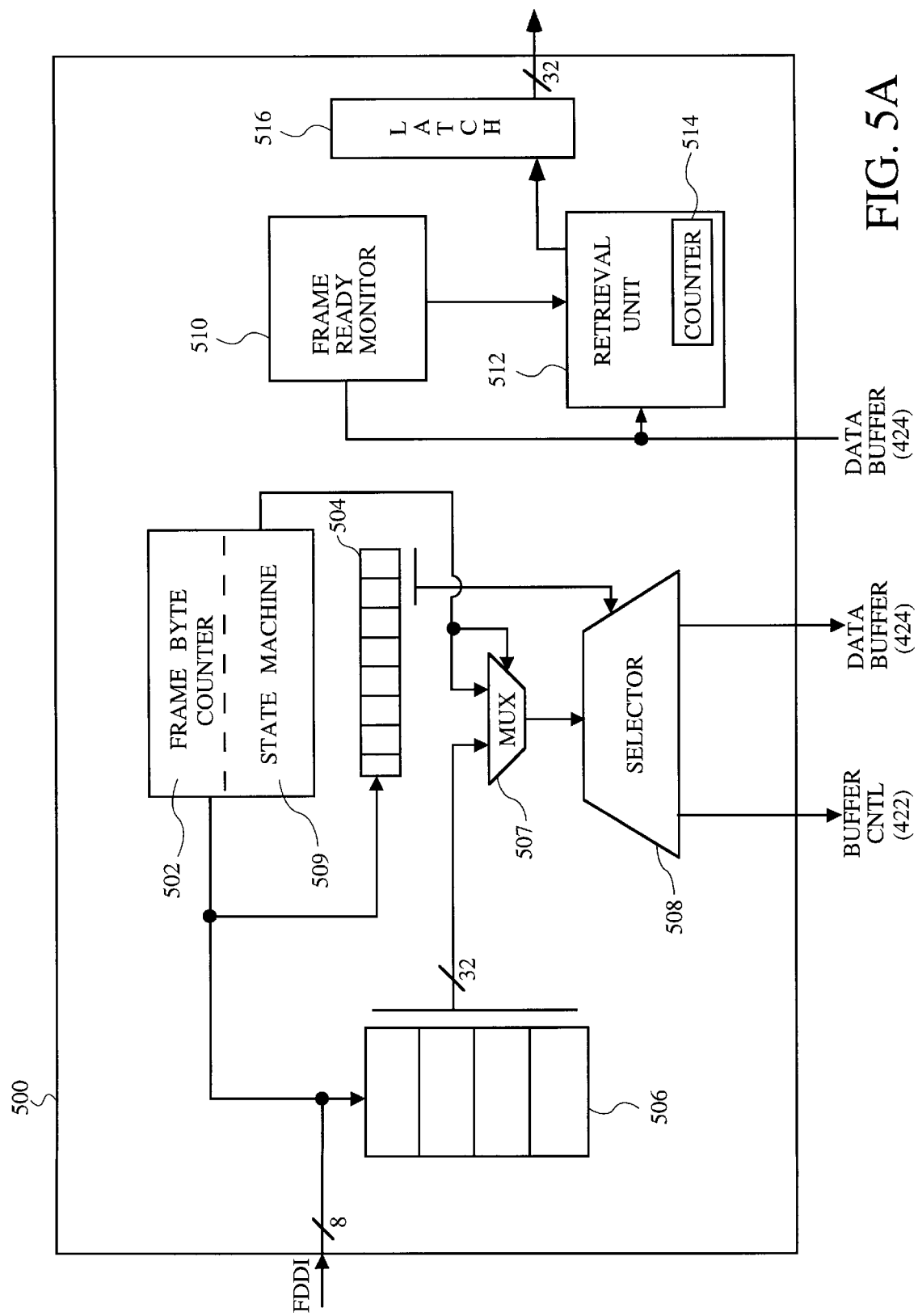
FIG. 5A is a detailed block diagram of a buffer manager according to an embodiment of the invention.

FIG. 5A is a detailed block diagram of a buffer manager 500 according to an embodiment of the invention. The buffer manager 500 is a preferred implementation of a first portion (receive portion) of the buffer manager 304 in FIG. 3. The buffer manager 500 operates to receive FDDI frames, store the frames to the frame storage memory 306, and then controls the forwarding of the stored FDDI frames from the frame storage memory 306 to the FDDI-to-Ethernet translator 312. The buffer manager 500 may also perform or assist in the performance of switching operations.

Once the start of an incoming FDDI frame is identified, a frame byte counter 502 begins counting the bytes within the FDDI frame. Also, the incoming data of the FDDI frame in units of bytes are stored in a register queue 506. The first byte of the FDDI frame which contains the frame control (FC) information is stored in a control register 504. The register queue 506 is provided because the incoming data is received in one byte units, whereas the output of the buffer manager 500 is in four byte units known as words. Preferably, the register queue 506 stores four bytes or one word (i.e., 32 bits). The word held in the queue 506 is supplied to a multiplexer 507 as an input. The control information is supplied to as another input to the multiplexer 507. The output of the multiplexer 507 is input to a selector 508. A state machine 509 supplies the control information to the multiplexer 507 and also controls which one of the inputs to the multiplexer 507 are output to the selector 508. The selector 508 directs its output to either the control receive buffer 422 or the data receive buffer 424 where it is temporarily stored. More particularly, the selector 508 directs its output to one of the control receive buffer 422 and the data receive buffer 424 depending upon the frame control (FC) information stored in the control register 504. The control register 504 or a state machine 509 can signal the selector for the appropriate selection. Specifically, the frame control (FC) information indicates whether the frame being received corresponds to network management data. Hence, when the frame being received corresponds to network management, the data associated with the frame is directed by the selector 508 to the control receive buffer 422. On the other hand, when the frame being received corresponds to data, the selector 508 directs the data to the data receive buffer 424.

The state machine 509 performs overall control for the buffer manager 500. In particular, the state machine 509 controls the generation of a buffer pointer address for both the control receive buffer 422 and the data receive buffer 424. As described with reference to FIG. 4, the control information includes the ready flag (R) 406, the skip flag (S) 408 and the link 410. By monitoring control information being received at the buffer manager 500 from a FDDI controller, the state machine 509 tracks the incoming data, including the start and the end of the FDDI frame. The FDDI controller is coupled to the buffer manager 500 and is capable of supply data lines, control lines representing various receiving states. The receiving states include, for example, Start of Data, End of Data, Frame Status, and Filler/Idle.

Figure 5B:
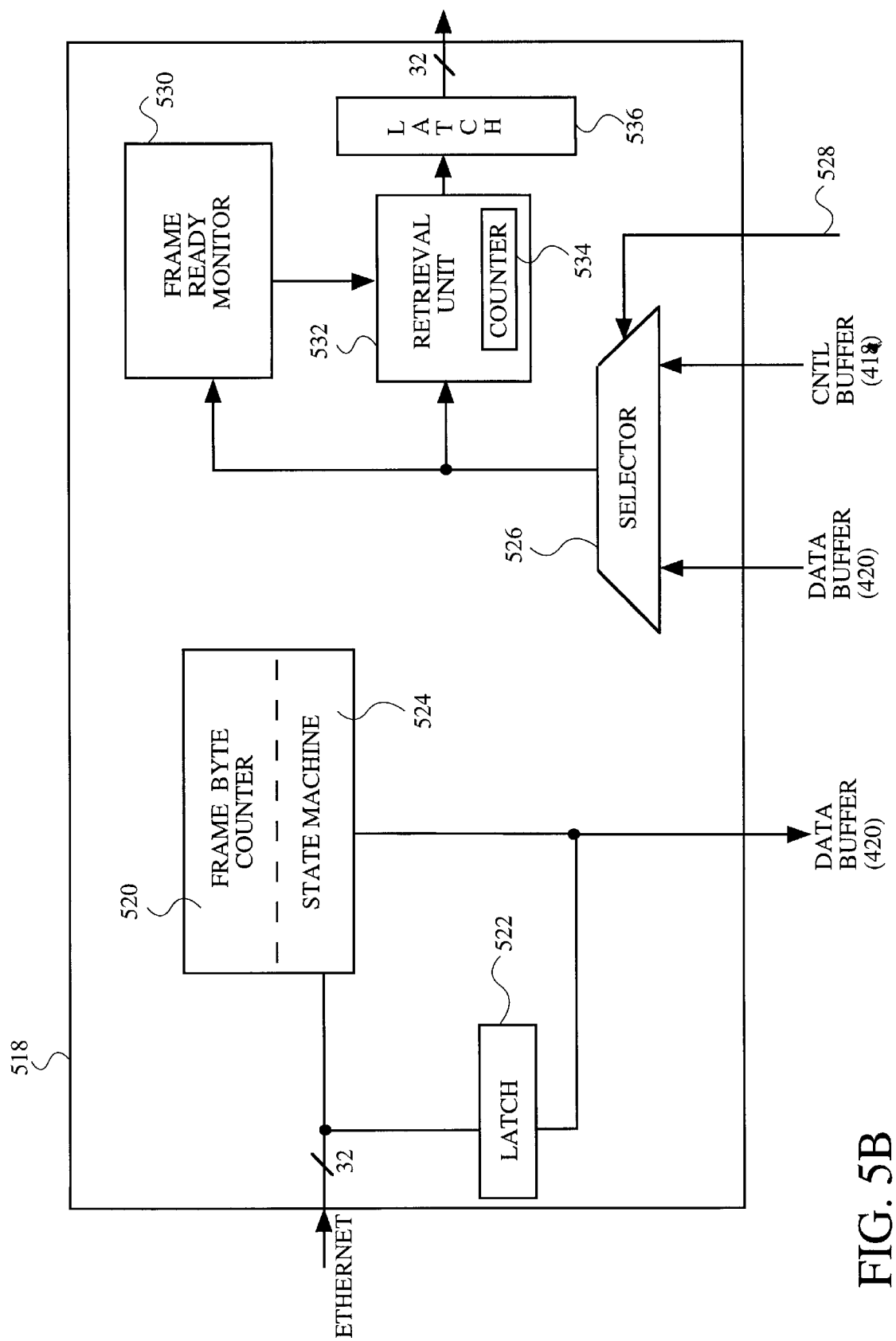
FIG. 5B is a detailed block diagram of a buffer manager according to another embodiment of the invention.
Figure 5C:
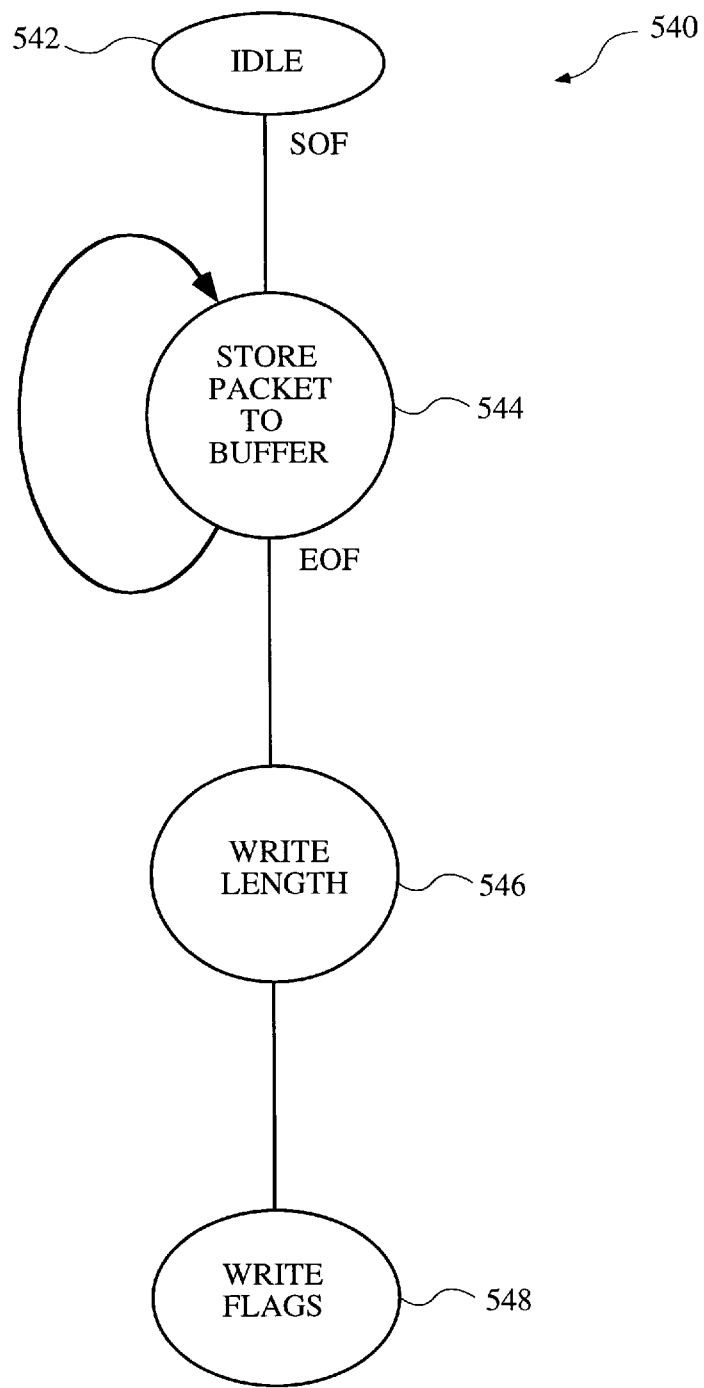
FIG. 5C is a state diagram of the processing performed by a state machine in the buffer manager illustrated in FIG. 5A.

FIG. 5C is a state diagram 540 of the processing performed by the state machine 509 in FIG. 5A. The state machine 509 initially resides in an idle state 542. Once a start of frame (SOF) has been detected, the state machine 509 proceeds to a store packet state where the incoming data packet is stored to one of the buffers 422, 424. Then, once the state machine 509 detects a frame stop (FS), the state machine 509 causes the frame byte counter 502 to stop counting and the register queue 506 to temporarily stop receiving incoming data. At this time, the count value from the frame byte counter 502 indicates the length of the frame that has just been received. The state machine 509 then proceeds to a write length state 546 where the count value (length) is stored to the second word 404 of the translation header within the data receive buffer 424. Then, the state machine 509 proceeds to a write flags state 548 where the ready flag (R) 406, the skip flag (S) 408 and the link 410 within the first word 402 of the translation header are set.

The buffer manager 500 also includes a frame-ready monitor 510, a retrieval unit 512 having a frame word counter 514, and a latch 516. The frame-ready monitor 510 monitors the first word 402 of the translation header within the data receive buffer 424 to determine whether the ready flag (R) 406 is set. When the ready flag (R) 406 is set, the frame-ready monitor 510 causes a retrieval unit 512 to begin operation. The retrieval unit 512 initially retrieves the length of the frame 414 from the second word 404 of the translation header and stores the retrieved length in the frame word counter 514. Then, the retrieval unit 512 causes the words of the frame 414 in the data receive buffer 424 to be sequentially latched into the latch 516 in word units (i.e., 32 bits). From the latch 516 the words are transmitted or forwarded to the FDDI-to-Ethernet translator 312, while decrementing the frame word counter 514 with each word of the frame being so latch.

FIG. 5B is a detailed block diagram of a buffer manager 518 according to an embodiment of the invention. The buffer manager 518 is a preferred implementation of a second portion (transmit portion) of the buffer manager 304 in FIG. 3. The buffer manager 518 operates to receive Ethernet frames, store the frames to the frame storage memory 306, and then controls the forwarding of the stored Ethernet frames from the frame storage memory 306 to the Ethernet-to-FDDI translator 312. The buffer manager 500 may also perform or assist in the performance of switching operations.

Once the start of an incoming Ethernet frame is identified, a frame byte counter 520 begins counting the bytes within the Ethernet frame. Also, the incoming data of the Ethernet frame in units of words (i.e., 32 bits) are stored in a latch 522. The word held in the latch 522 is directed to the data transmit buffer 420 where it is temporarily stored. A state machine 524 performs overall control for the buffer manager 518. The processing performed by the state machine 524 is similar or analogous to the processing 540 illustrated in FIG. 5C for the state machine 509.

One operation of the state machine is to oversee the storage of the words of the Ethernet frame from the latch 522 to the frame region 414 within the data transmit buffer 420. The control transmit buffer 418 stores control frames that are generated by a local processor (e.g., microprocessor 308). The processor constructs the control frames in the control transmit buffer 418 and initiates their transmission by setting the ready flag (R) 406. Once the state machine 524 of the buffer manager 518 determines that the end of the frame has been received, the frame byte counter 520 stops counting and the latch 522 temporarily stops receiving incoming data. At this time, the count value from the frame byte counter 520 indicates the length of the frame that has just been received.

The state machine 524 then causes the count value (length) to be stored to the second word 404 of the translation header within the data transmit buffer 420. Next, the ready flag (R) 406, the skip flag (S) 408 and the link 410 within the first word 402 of the translation header are set by the state machine 524.

The buffer manager 518 also includes a selector 526 controlled by a select signal 528, a frame-ready monitor 530, a retrieval unit 532 having a frame word counter 534, and a latch 536. The selector 526 selects one of the data from the data transmit buffer 420 and the control buffer 418 to be output based on the select signal 528. The output of the selector 526 is coupled to the frame ready monitor 530 and the retrieval unit 532. The frame-ready monitor 530 monitors the first word 402 of the translation header within the selected one of the data transmit buffer 420 and the control transmit buffer 418 to determine whether the ready flag (R) 406 is set. When the ready flag (R) 406 is set, the frame-ready monitor 530 causes a retrieval unit 534 to begin operation. The retrieval unit 532 initially retrieves the length (count value) of the frame 414 from the second word 404 of the translation header and then stores the length in the frame word counter 534. Then, the retrieval unit 532 causes the words of the frame 414 in the selected receive buffer 418 or 420 to be sequentially latched into the latch 536 in word units (i.e., 32 bits). From the latch 536 the words are transmitted or forwarded to the Ethernet-to-FDDI translator 316, while decrementing the frame word counter 534 with each word of the frame being so latch.

Figure 6:
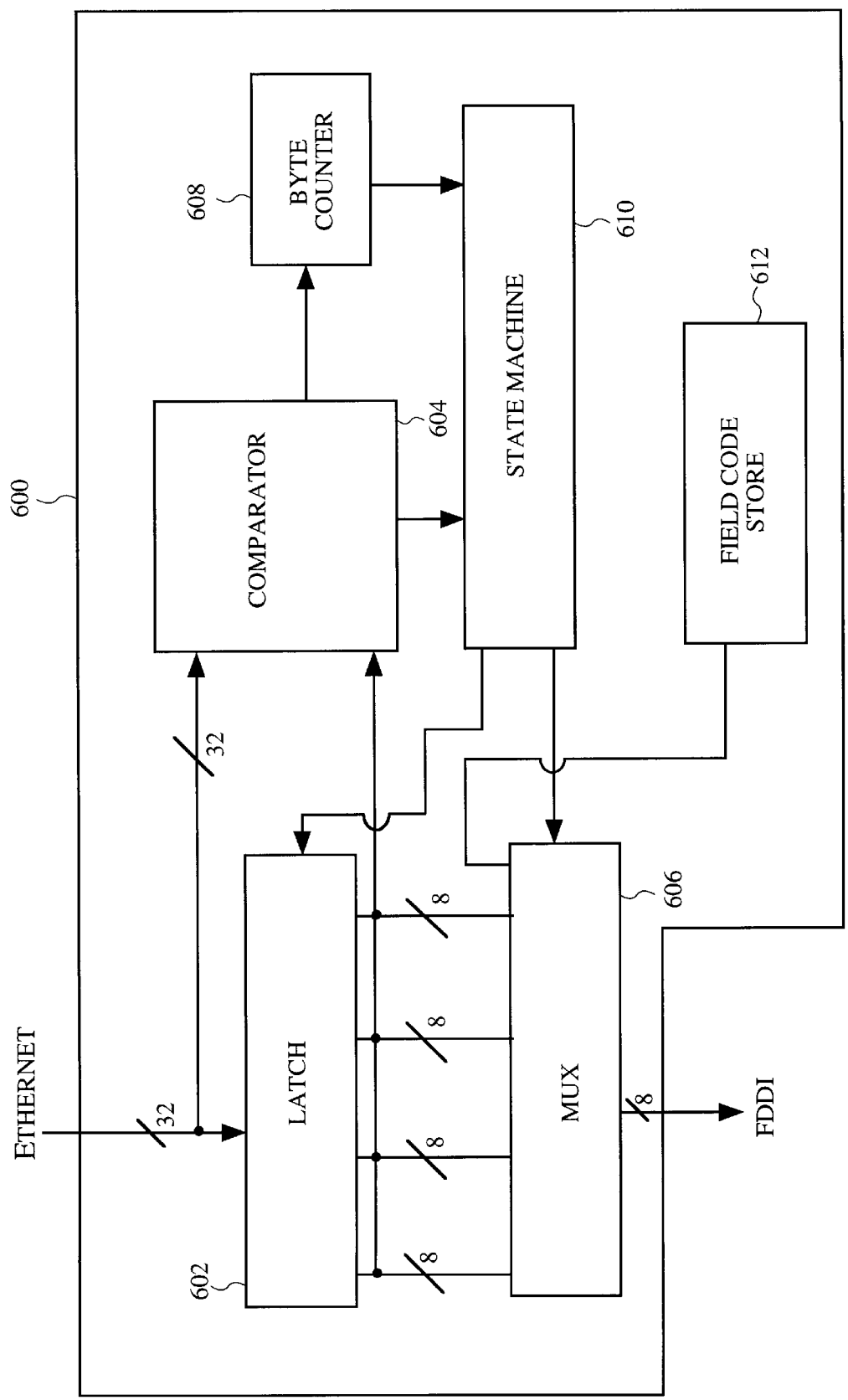
FIG. 6 is a block diagram of an Ethernet-to-FDDI translator according to an embodiment of the invention.

FIG. 6 is a block diagram of an Ethernet-to-FDDI translator 600 according to an embodiment of the invention. The Ethernet-to-FDDI translator 600 is a detailed diagram of a preferred implementation of the Ethernet-to-FDDI translator 316 illustrated in FIG. 3. The Ethernet-to-FDDI translator 600 is implemented in hardware so that translation of Ethernet frames to FDDI frames can be performed at very high speeds.

The Ethernet-to-FDDI translator 600 receives the Ethernet frame and a frame length from the buffer manager 304. . The Ethernet frame is stored a word at a time in a latch 602. Preferably, with respect to the buffer manager 518 of FIG. 5B, the latch 602 holds the words of the Ethernet frame supplied by the frame 414 in either the data receive buffer 420 or the control receive buffer 418 of the Ethernet-to-FDDI translator 600 via the latch 536. The frame length is received prior to receiving the words of the Ethernet frame and is stored in a comparator 604.

The outputs of the latch 602 are coupled to a multiplexer 606 which outputs bytes of the FDDI frame. The output of the latch 602 is also coupled to the comparator 604 which performs some comparisons on the words of the Ethernet frame being received. The comparator 604 receives the incoming words of the Ethernet frame. At the beginning of each Ethernet frame, a byte counter 608 is initiation. The comparator 604 supplies comparison data to a state machine 610 during the receiving and processing of the words of the Ethernet frame. The byte counter 608 also supplies a byte count to the state machine 610. The state machine 610 is implemented by hardware to control the latch 602 and the multiplexer 606 to implement the translation of the Ethernet frame to the FDDI frame at very high speeds.

A field code store 612 is also provided within the Ethernet-to-FDDI translator 600 to store various predetermined field codes that are needed for the translation operations. The field codes stored in the field code store 612 are supplied to the input side of the multiplexer 606. Hence, the state machine 610 controls the multiplexer 606 to output a byte from either the field code store 612 or the latch 602. In this embodiment, the multiplexer 606 would be a 5-to-1 byte multiplexer.

Figure 7:
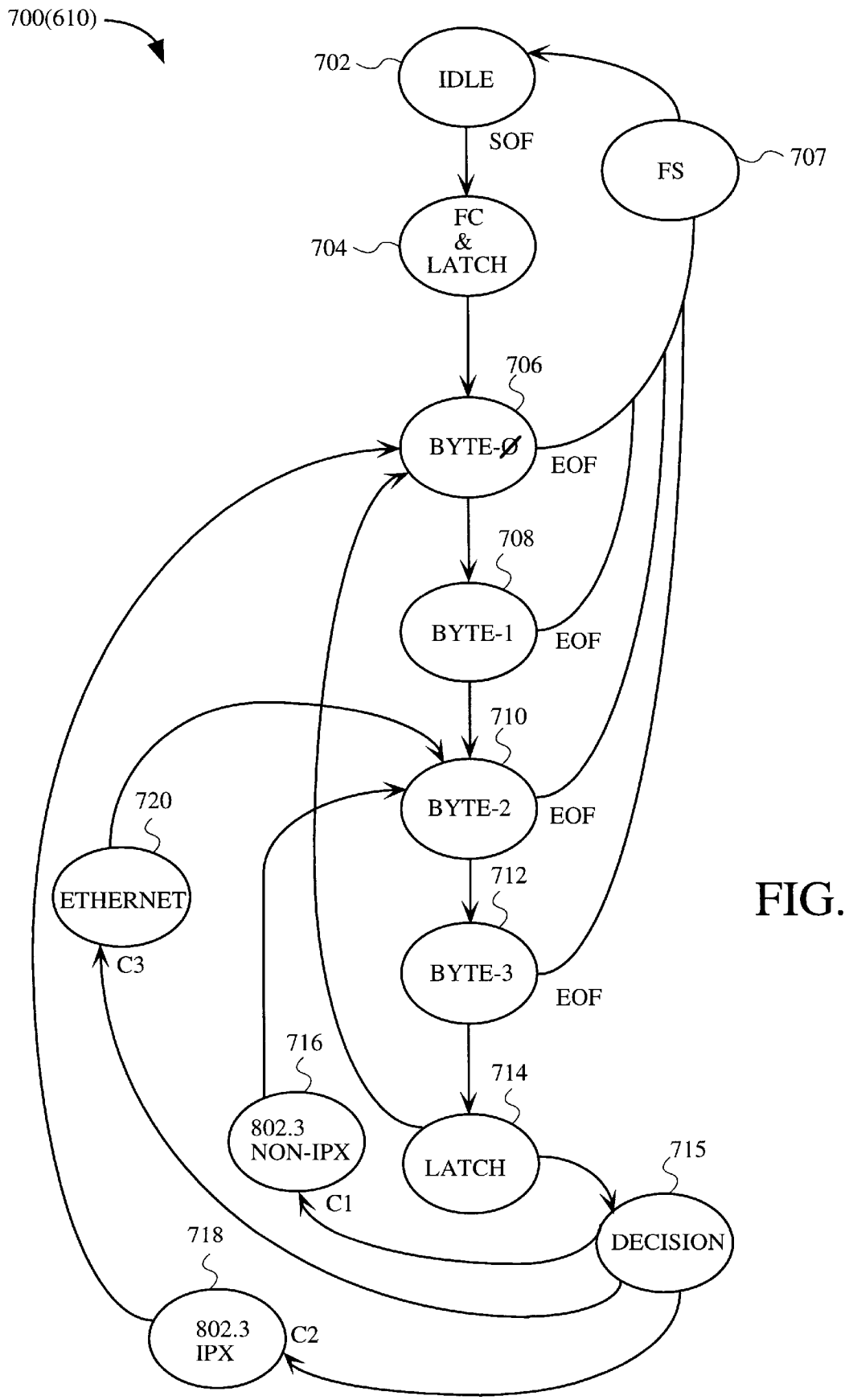
FIG. 7 is a state diagram of the processing performed by a state machine of the Ethernet-to-FDDI translator illustrated in FIG. 6.

FIG. 7 is a state diagram 700 of the processing performed by the state machine 610 illustrated in FIG. 6. In other words, the state diagram 700 diagrams the operations of the state machine 610 which serve to control the other devices within the Ethernet-to-FDDI translator 600 so as to translate the incoming Ethernet frame to an outgoing FDDI frame.

According to the state diagram 700, the state machine 610 initially remains in an idle state 702 until a start of frame (SOF) is identified as being input to the Ethernet-to-FDDI translator 600. The comparator 604 within the translator 600 determines when the start of frame (SOF) is received. Until the start of frame (SOF) is received at the Ethernet-to-FDDI translator 600, the state machine 610 remains in the idle state. Once the start of frame (SOF) is identified, the state machine 610 transitions to a frame control and latch state 704 as illustrated in the state diagram 700. In the frame control and latch state 704, a frame control (FC) field for the FDDI frame being output is supplied from the field code store 612 to the multiplexer 606 where it is output as the first byte of the FDDI frame. In this exemplary case, the frame control (FC) field is the value $50_{HEX}$ because this signifies a data frame in FDDI. The frame control and latch state 704 also causes the state machine 610 to signal the latch 602 to latch a next word of the Ethernet frame being received. With respect to the buffer manager 518 illustrated in FIG. 5B, the word being latched into the latch 602 is the word being held in the latch 536.

After the frame control and latch state 704, the state machine 610 passes control to a byte-0 state 706 as illustrated in the state diagram 700. In the byte-0 state 706, the state machine 610 controls the multiplexer 606 such that the first byte of the word held in the latch 602 is output by the multiplexer 606 as part of the FDDI frame. Then, if the byte being output by the multiplexer 606 is the end of frame (EOF), then the processing is complete and the state machine 610 passes control to a frame stop state 707 were a frame stop (FS) is output as the last field of the FDDI frame. In this exemplary case, the frame control (FS) is given the value $50_{HEX}$ because this signifies the end of a FDDI frame. Following the frame stop state 707, the state machine 610 returns to the idle state 702 to await processing of a next frame. Otherwise, following the byte-0 state 706, the state machine 610 proceeds to a byte-1 state 708 as illustrated in the state diagram 700.

In the byte-1 state 708, the state machine 610 controls the multiplexer 606 such that the second byte of the word held in the latch 602 is output by the multiplexer 606 as part of the FDDI frame. Then, if the byte being output by the multiplexer 606 is the end of frame (EOF), then the processing is complete and the state machine 610 returns to the idle state 702 via the frame stop state 707. Otherwise, the state machine 610 proceeds to a byte-2 state 710 as illustrated in the state diagram 700.

In the byte-2 state 710, the state machine 610 controls the multiplexer 606 such that the third byte of the word held in the latch 602 is output by the multiplexer 606 as part of the FDDI frame. Then, if the byte being output by the multiplexer 606 is the end of frame (EOF), then the processing is complete and the state machine 610 returns to the idle state 702 via the frame stop state 707. Otherwise, the state machine 610 proceeds to a byte-3 state 712 as illustrated in the state diagram 700.

In the byte-3 state 712, the state machine 610 controls the multiplexer 606 such that the fourth byte of the word held in the latch 602 is output by the multiplexer 606 as part of the FDDI frame. Then, if the byte being output by the multiplexer 604 is the end of the frame (EOF), then the processing is complete and the state machine 610 returns to the idle state 702 via the frame stop state 707. Otherwise, the state machine 610 proceeds to a latch state 714 as illustrated in the state diagram 700.

In the latch state 714, the byte count supplied by the byte counter 608 is evaluated to determine whether the latch 602 contains the appropriate bytes of the incoming frame that identify its current frame format. For example, in this exemplary embodiment the translating is from one of several Ethernet formats to a FDDI format. If the appropriate bytes (13–16) of the incoming Ethernet frame are not currently in the latch 602, the state machine 610 returns to the byte-0 state 706. On the other hand, when the byte count indicated by the byte counter 608 is the appropriate value, then the appropriate bytes (13–16) are currently held in the latch 602 and the state machine 610 proceeds to a decision state 715.

The decision state 715 activates one of states 716, 718 and 720 to properly translate the incoming data associated with the Ethernet frame. If a first condition (C1) is satisfied, then the state 716 is activated to translate the incoming frame from the 802.3 non-IPX standard to the FDDI standard. Following the state 716, the state machine 610 returns to the byte-2 state 710. If instead, a second condition (C2) is satisfied, the state 718 is activated. The state 718 operates to translate the incoming frame from the 802.3 IPX standard to the FDDI standard. Then, following the state 718, the state machine 610 returns to the byte-0 state 706. If the third condition (C3) is satisfied, the state 720 is activated. The state 720 operates to translate the incoming frame from the Ethernet standard to the FDDI format. Subsequent to the state 720, the state machine 610 returns to the byte-2 state 710. The state machine 610 continues to sequence through the states in the above described manner until the state machine 610 returns to the idle state 702.

The operations of the states 716, 718 and 720 are explained in more detail below with reference to the following examples.

EXAMPLE 1

802.3 IPX to FDDI

A received Ethernet frame according to the 802.3 IPX standard has the following format.

| DA | SA | Length | FFFF | Data | FSC |
|----|----|--------|------|------|-----|

The destination address (DA) and the source address (SA) fields are six (6) bytes each, the Length field is two (2) bytes, the IPX identifier field is two (2) bytes, the data field contains n bytes, and the frame check sequence (FCS) is one (1) byte.

The resulting FDDI frame produced by translating the above 802.3 IPX standard frame has the following format.

| FC | DA' | SA' | SNAP | SNAP | CNTL | OUI | Type | Data | FCS | FS |
|----|-----|-----|------|------|------|-----|------|------|-----|----|

The frame control (FC) is one (1) byte, the destination address (DA') and the source address (SA') fields are six (6) bytes each, the SNAP fields are one (1) byte each, the control field (CNTL) is one (1) byte, the OUI field is three (3) bytes, the type field is two (2) bytes, the data field contains n bytes, the frame check sequence (FCS) is one (1) byte, and the frame stop (FS) is one (1) byte. The DA' and the SA' follow little endian, whereas DA and SA follow bit endian. The reversal of bit order is conventionally performed by the FDDI controller.

The sequencing through the state diagram 700 in performing the translation operations performed by the Ethernet-to-FDDI translator 518 to translate the 802.3 IPX standard frame to the FDDI frame are as follows:

1. State FC and latch: FC output ($50_{HEX}$) and $DA_1$–$DA_4$ latched
2. Byte-0 through Byte-3: $DA_1$–$DA_4$ output
3. Latch: $DA_5$–$DA_6$ and $SA_1$–$SA_2$ latched; byte count=8
4. Byte-0 through Byte-3: $DA_5$–$DA_6$ and $SA_1$–$SA_2$ output
5. Latch: $SA_3$–$SA_6$ latched; byte count=12
6. Byte-0 through Byte-3: $SA_3$–$SA_6$ output
7. Latch: Length and FF, $FF_{HEX}$; byte count=16
8. Decision: C2 is true as first two bytes latched<$0600_{HEX}$ and second two bytes latched=$FFFF_{HEX}$
9. 802.3 IPX: E0, E0, 03, xx, xx, xx are sequentially output
10. Byte-2 and Byte-3: FF, $FF_{HEX}$ are sequentially output
11. Latch: $D_1$–$D_4$; byte count=20
12. Byte-0 through Byte-3: $D_1$–$D_4$ output
13. Steps 11–12 repeat for remaining bytes of the Ethernet frame (i.e., until byte count=determined length of Ethernet frame).
14. FS: FS output ($20_{HEX}$)
15. Idle: Await next frame to be translated Note in step 7, the decision is based on what is in the length or type field of the Ethernet frame. With 802.3 IPX, the type field is "$FFFF_{HEX}$" (in the case of AppleTalk it is "80F3") and it follows the length field. With 802.3 non-IPX, the type field is not "FFFF" (and not "$80F3_{HEX}$") and it follows the length field. In either case, the length field is less than $0600_{HEX}$ (1536). With ordinary Ethernet, there is no length field and the type field is "$FFFF_{HEX}$" (in the case of AppleTalk it is "80F3"). Hence, the second condition (C2) identifies the incoming Ethernet frame as a 802.3 IPX frame when the value in the length field is less than $0600_{HEX}$ (1536) and the value in the sequentially following field (i.e., type field) is $FFFF_{HEX}$. (or $80F3_{HEX}$ in the case of AppleTalk). Also note that in step 13, the byte count in the byte counter 608 is the count of the bytes of the Ethernet frame that have been latched, and the length of the Ethernet frame is the frame length stored in the comparator 604. The Ethernet frame is completely latched when the byte count equals the frame length, this is how the EOF is determined. Moreover, note that step 9 pertains to the operations performed when the state machine 610 is in the 802.3 IPX state 718.

EXAMPLE 2

802.3 non-IPX to FDDI

A received Ethernet frame according to the 802.3 non-IPX standard has the following format.

| DA | SA | Length | DSAP | SSAP | CNTL | OUI | Type | Data | FSC |
|----|----|--------|------|------|------|-----|------|------|-----|

The destination address (DA) and the source address (SA) fields are six (6) bytes each, the Length field is two (2) bytes, the DSAP and the SSAP fields are each one (1) byte, the control field (CNTL) is one (1) byte, the OUI field is one (1) byte, the type field is two (2) bytes, the data field contains n bytes, and the frame check sequence (FCS) is one (1) byte.

The resulting FDDI frame produced by translating the above 802.3 non-IPX standard frame has the same format as in the first example.

The sequencing through the state diagram 700 in performing the translation operations performed by the Ethernet-to-FDDI translator 518 to translate the 802.3 non-IPX standard frame to the FDDI frame are as follows:

1. State FC and latch: FC output ($50_{HEX}$) and $DA_1-DA_4$ latched
2. Byte-0 through Byte-3: $DA_1-DA_4$ output
3. Latch: $DA_5-DA_6$ and $SA_1-SA_2$ latched; byte count=8
4. Byte-0 through Byte-3: $DA_5-DA_6$ and $SA_1-SA_2$ output
5. Latch: $SA_3-SA_6$ latched; byte count=12
6. Byte-0 through Byte-3: $SA_3-SA_6$ output
7. Latch: Length, DSAP and SSAP; byte count=16
8. Decision: C1 is true as first two bytes latched are<$0600_{HEX}$ and second two bytes latched not=$FFFF_{HEX}$
9. 802.3 non-IPX: noop
10. Byte-2 and Byte-3: DSAP and SSAP are sequentially output
11. Latch: CNTL and OUI; byte count=20
12. Byte-0 through Byte-3: CNTL and OUI sequentially output
13. Latch: FF, $FF_{HEX}$ and $D_1$ and $D_2$; byte count=24
14. Byte-0 through Byte-3: FF, $FF_{HEX}$ and $D_1$ and $D_2$ sequentially output
15. Latch: $D_3-D_6$; byte count=28
16. Byte-0 through Byte-3: $D_3-D_6$ output
17. Steps 15–16 repeat for remaining bytes of the Ethernet frame (i.e., until byte count=determined length of Ethernet frame).
18. FS: FS output ($20_{HEX}$)
19. Idle: Await next frame to be translated Note in step 8, the decision is based on what is in the length or type field of the Ethernet frame. With 802.3 non-IPX the length field exists followed by the type field which is "FFFF" (in the case of AppleTalk it is "80F3"). Hence, the first condition (C1) identifies the incoming Ethernet frame as a 802.3 non-IPX frame when the value in the length field is less than $0600_{HEX}$ (1536) and the value in the sequentially following field (i.e., type field) is not $FFFF_{HEX}$. (or not $80F3_{HEX}$ in the case of AppleTalk).

EXAMPLE 3

Ethernet to FDDI

A received Ethernet frame according to the original Ethernet standard has the following format.

| DA | SA | Type | Data | FCS |
|----|----|------|------|-----|

The destination address (DA) and the source address (SA) fields are six (6) bytes each, the Type field is two (2) bytes, the data field contains n bytes, and the frame check sequence (FCS) is one (1) byte. The Type field usually contains $FFFF_{HEX}$, but in the case of AppleTalk is $80F3_{HEX}$. In this example, it is assumed that the Type field contains $FFFF_{HEX}$.

The resulting FDDI frame produced by translating the above 802.3 non-IPX standard frame has the same format as in the first example.

The sequencing through the state diagram 700 in performing the translation operations performed by the Ethernet-to-FDDI translator 518 to translate the Ethernet standard frame to the FDDI frame are as follows:

1. State FC and latch: FC output ($50_{HEX}$) and $DA_1-DA_4$ latched
2. Byte-0 through Byte-3: $DA_1-DA_4$ output
3. Latch: $DA_5-DA_6$ and $SA_1-SA_2$ latched; byte count=8
4. Byte-0 through Byte-3: $DA_5-DA_6$ and $SA_1-SA_2$ output
5. Latch: $SA_3-SA_6$ latched; byte count=12
6. Byte-0 through Byte-3: $SA_3-SA_6$ output
7. Latch: FF, $FF_{HEX}$ and $D_1$ and $D_2$; byte count=16
8. Decision: C3 is true as first two bytes latched≧$0600_{HEX}$.
9. Ethernet: AA, AA, 03, 00, 00, $00_{HEX}$ are sequentially output [in the case of AppleTalk: AA, AA, 03, 00, 00, $F8_{HEX}$]
10. Byte-0 and Byte-3: FF, $FF_{HEX}$, $D_1$ and $D_2$ are sequentially output
11. Latch: $D_3-D_6$; byte count=20
12. Byte-0 through Byte-3: $D_3-D_6$ output
13. Steps 11–12 repeat for remaining bytes of the Ethernet frame (i.e., until byte count=determined length of Ethernet frame).
14. FS: FS output ($20_{HEX}$)
15. Idle: Await next frame to be translated Note in step 7, the decision is based on what is in the length or type field of the Ethernet frame. With ordinary Ethernet, there is no length field and the type field is $FFFF_{HEX}$ (in the case of AppleTalk it is $80F3_{HEX}$). Hence, the second condition (C3) identifies the incoming Ethernet frame as a ordinary Ethernet frame when the value in the type field is greater than or equal to $0600_{HEX}$ (1536) which it will be in the case of ordinary Ethernet where the type field is $FFFF_{HEX}$. (or $80F3_{HEX}$ in the case of AppleTalk). Also note that in step 13, the byte count in the byte counter 608 is the count of the bytes of the Ethernet frame that have been latched, and the determined length of the Ethernet frame is stored in the comparator 604. The Ethernet frame is completely latched when the byte count equals the frame length, this is how the EOF is determined. Moreover, note that step 9 pertains to the operations performed when the state machine 610 is in the 802.3 Ethernet state 720.

Figure 8:
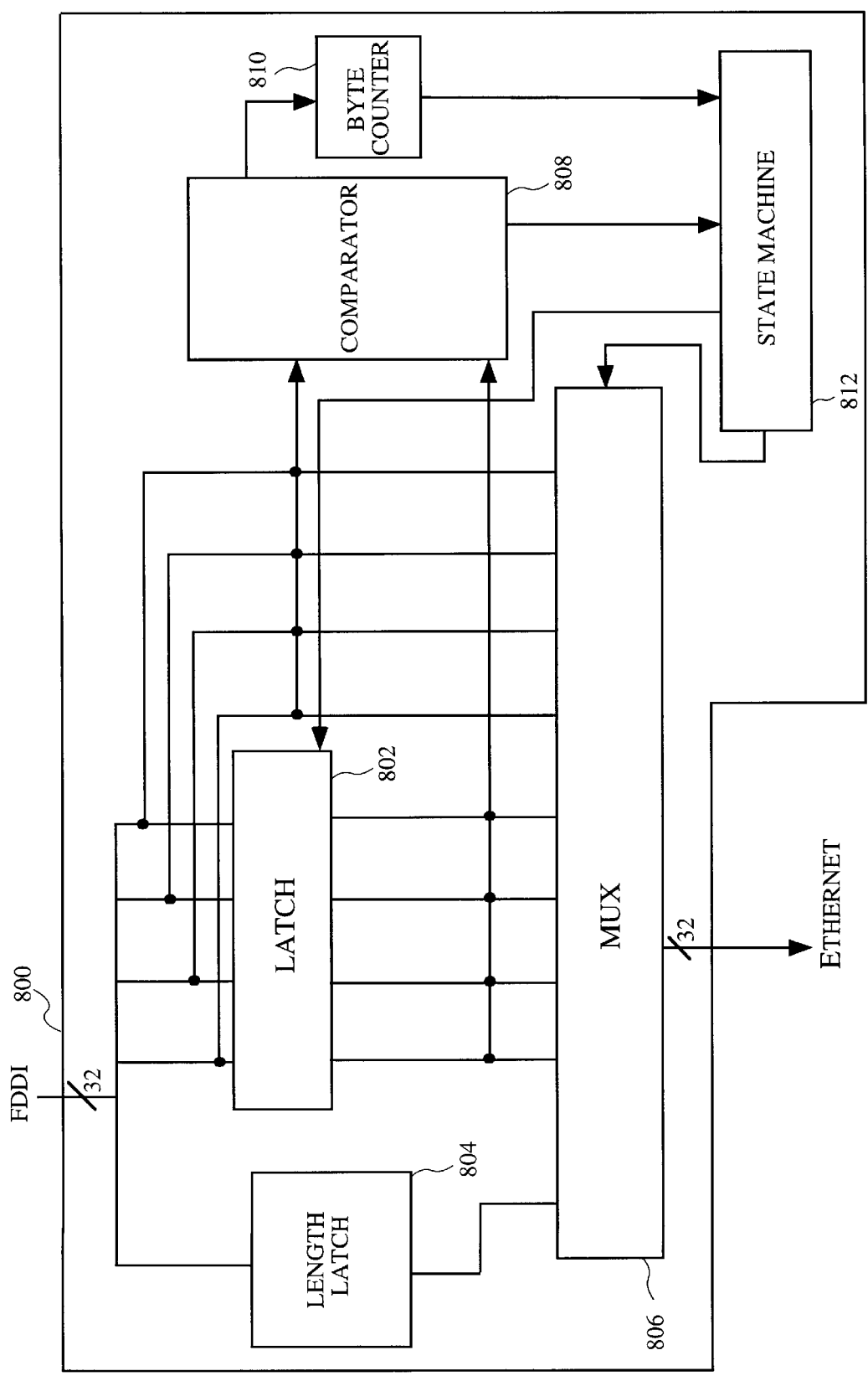
FIG. 8 is a block diagram of a FDDI-to-Ethernet translator according to an embodiment of the invention.

FIG. 8 is a block diagram of a FDDI-to-Ethernet translator 800 according to an embodiment of the invention. The FDDI-to-Ethernet translator 800 is a detailed diagram of a preferred implementation of the FDDI-to-Ethernet translator 312 illustrated in FIG. 3. The FDDI-to-Ethernet translator 800 is implemented in hardware so that translation of the FDDI frames to Ethernet frames can be performed at very high speeds.

The FDDI-to-Ethernet translator 800 includes a latch 802 which receives a word of the incoming FDDI frame. The incoming word is also forwarded to a length latch 804 that operates to store the length of the incoming FDDI frame which is the second word 404 within the translation header for the FDDI frame that is stored in the data receive buffer 424 (FIG. 4B). The FDDI-to-Ethernet translator 800 also includes a multiplexer 806. The multiplexer 806 receives inputs from the length latch 804, the outputs of the latch 802 (latched word), and the inputs to the latch 802 (incoming word). The incoming word of the FDDI frame and the latched word of the FDDI frame output from the latch 802 are both coupled to a comparator 808. The reason that the incoming word is directly supplied to the multiplexer 806 so that an odd number of bytes maybe added or subtracted during the translation process. That is, the multiplexer 806 is able to output a non-32-bit aligned word to the switch interface 314. The comparator 808 performs various comparisons on the bytes of the FDDI frame to guide the translation operation. The FDDI-to-Ethernet translator 800 further includes a byte counter 810. The byte counter 810 operates to count bytes that have been received at the latch 802. The byte counter 810 in this embodiment is controlled by the comparator 808 so that it begins counting at the beginning of a an incoming frame, and thereafter counts each byte (of a particular frame) that has been latched into the latch 802. A state machine 812 is also included within the FDDI-to-Ethernet translator 800. The state machine 812 operates to control the translation operation by selecting which of the various input bytes to the multiplexer 806 that are to be output as part of the Ethernet frame. During the receiving and the processing of the words of the FDDI frame, the comparator 808 supplies the results of the various comparisons to the state machine 812 and the byte counter 810 supplies a byte count to the state machine 812. The state machine 812 is implemented by hardware to control the latch 802 and the multiplexer 806 to implement the translation of the FDDI frame to the Ethernet frame at very high speeds.

Figure 9:
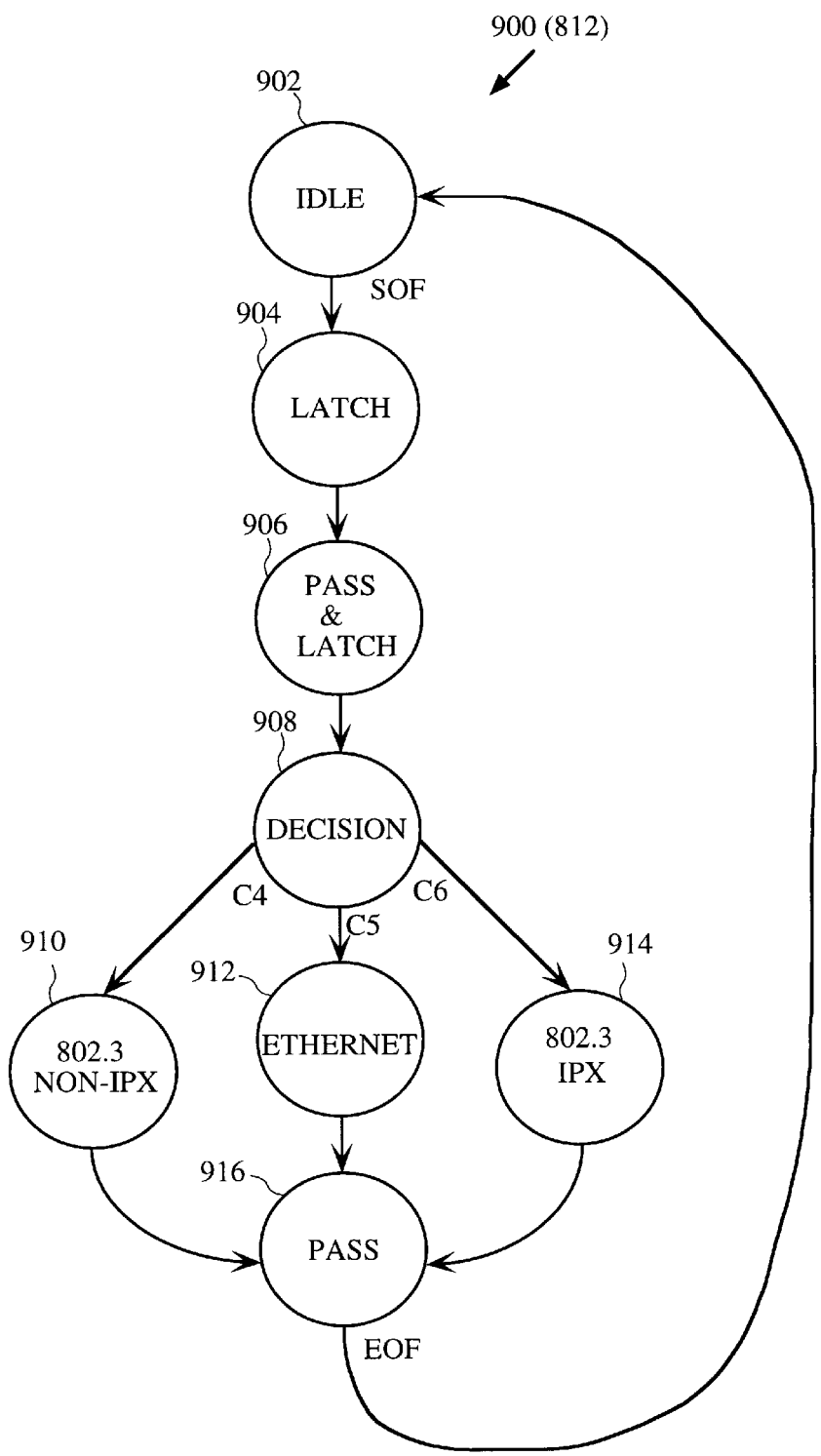
FIG. 9 is a state diagram of the processing performed by a state machine of the FDDI-to-Ethernet translator illustrated in FIG. 8.

FIG. 9 is a state diagram 900 of the processing performed by the state machine 812 of the FDDI-to-Ethernet translator 800 illustrated in FIG. 8. In other words, the state diagram 900 diagrams the operations of the state machine 812 which serve to control the other devices within the FDDI-to-Ethernet translator 800 so as to translate the incoming FDDI frame to an outgoing Ethernet frame.

The state machine 812 initially resides in an idle state 902. Once a start of frame (SOF) has been received and identified by the FDDI-to-Ethernet translator 800, the state machine 812 proceeds to a latch state 904 as illustrated in the flow diagram 900. In the latch state 904, the state machine 812 signals the latch 802 to latch a word of the FDDI frame into the latch 802. Then, the state machine 812 proceeds to a pass and latch state 906. In the pass and latch state 906, the state machine 812 controls the multiplexer 806 to output the word of data stored in the latch 802 to form part of the Ethernet frame. The pass and latch state 906 then operates to latch the next word of the FDDI frame into the latch 802.

Following the pass and latch state 906, a decision state 908 determines the particular translation to be performed. If a fourth condition (C4) is satisfied, the state machine 812 performs a state 910 to convert the FDDI frame from the FDDI standard to the 802.3 non-IPX standard. Alternatively, if a fifth condition (C5) is satisfied, a state 912 is activated to convert the FDDI frame to the ordinary Ethernet standard. On the other hand, if a sixth condition (C6) is satisfied, a state 914 is activated to convert the FDDI frame to the 802.3 IPX standard. Following the states 910, 912 and 914, the state machine 812 activates a pass state 916 as illustrated by the flow diagram 900. In the pass state 916, the state machine 812 operates to control the multiplexer 806 and the latch 802 to sequentially output the remaining words of the FDDI frame to the Ethernet frame. Once the end of frame (EOF) has been latched in the latch 802 and then output via the multiplexer 806 to the Ethernet frame, the state machine 812 returns to the idle state 902 and awaits the start of the next FDDI frame to be translated and transmitted.

The operations of the states 910, 912 and 914 are explained in more detail below with reference to the following examples.

EXAMPLE 4

FDDI to 802.3 non-IPX

The received FDDI frame has the following format.

| FC | DA' | SA' | SNAP | SNAP | CNTL | OUI | Type | Data | FCS | FS |
|----|-----|-----|------|------|------|-----|------|------|-----|-----|

The frame control (FC) is one (1) byte, the destination address (DA') and the source address (SA') fields are six (6) bytes each, the SNAP fields are one (1) byte each, the control field (CNTL) is one (1) byte, the OUI field is three (3) bytes, the type field is two (2) bytes, the data field contains n bytes, the frame check sequence (FCS) is one (1) byte, and the frame stop (FS) is one (1) byte. The DA' and the SA' follow little endian, whereas DA and SA follow bit endian. The reversal of bit order is conventionally performed by the FDDI controller.

The resulting 802.3 non-IPX frame produced by translating the FDDI frame has the following format.

| DA | SA | Length | DSAP | SSAP | CNTRL | OUI | Type | Data | FSC |
|----|----|----|------|------|-------|-----|------|------|-----|

The destination address (DA) and the source address (SA) fields are six (6) bytes each, the Length field is two (2) bytes, the DSAP and the SSAP fields are each one (1) byte, the control field (CNTL) is one (1) byte, the OUI field is one (1) byte, the type field is two (2) bytes, the data field contains n bytes, and the frame check sequence (FCS) is one (1) byte.

The sequencing through the state diagram 900 in performing the translation operations performed by the FDDIto-Ethernet translator 800 to translate the FDDI frame to the 802.3 non-IPX frame are as follows.

1. Latch: determined length latched, and FC, $DA_1$–$DA_6$, $SA_1$–$SA_6$ latched; byte count=13
2. Pass and Latch: $DA_1$–$DA_6$ and $SA_1$–$SA_6$ output; and SNAP, SNAP, CNTL, OUI[1] latched; byte count=12
3. Decision: C4 is true as SNAP && SNAP && CNTL # $AAAA02_{HEX}$ or $E0E003_{HEX}$
4. 802.3 non-IPX:
   Output determined length
   Output SNAP, SNAP, CNTL, OUI[1]
   Latch OUI[2], OUI[3], Type [$FFFF_{HEX}$ $80F3_{HEX}$]
   Output OUI[2], OUI[3], Type
5. Pass: repeat latching and outputting next four bytes of the frame until FS
6. Idle: Await next frame to be translated

EXAMPLE 5

FDDI to Ethernet

The received FDDI frame has the same format as in the fourth example. The resulting Ethernet frame produced by translating the FDDI frame has the following format.

| DA | SA | Type | Data | FCS |
|----|----|------|------|-----|

The destination address (DA) and the source address (SA) fields are six (6) bytes each, the Type field is two (2) bytes, the data field contains n bytes, and the frame check sequence (FCS) is one (1) byte. The Type field usually contains $FFFF_{HEX}$, but in the case of AppleTalk is $80F3_{HEX}$. In this example, it is assumed that the Type field contains $FFFF_{HEX}$.

The sequencing through the state diagram 900 in performing the translation operations performed by the FDDI-to-Ethernet translator 800 to translate the FDDI frame to the Ethernet frame are as follows.

1. Latch: determined length latched, and FC, $DA_1$–$DA_6$, $SA_1$–$SA_6$ latched; byte count=13
2. Pass and Latch: $DA_1$–$DA_6$ and $SA_1$–$SA_6$ output; and SNAP, SNAP, CNTL, OUI[1] latched; byte count=12
3. Decision: C5 is true as SNAP && SNAP && CNTL == $AAAA02_{HEX}$
4. Ethernet:
   Latch OUI[2], OUI[3], Type [$FFFF_{HEX}$ $80F3_{HEX}$]
   Output Type
5. Pass: repeat latching and outputting next four bytes of the frame until FS
6. Idle: Await next frame to be translated

EXAMPLE 6

FDDI to 802.3 IPX

The received FDDI frame has the same format as in the fourth example. The resulting 802.3 IPX frame produced by translating the FDDI frame has the following format.

| DA | SA | Length | FFFF | Data | FSC |
|----|----|--------|------|------|-----|

The destination address (DA) and the source address (SA) fields are six (6) bytes each, the Length field is two (2) bytes, the IPX identifier field is two (2) bytes, the data field contains n bytes, and the frame check sequence (FCS) is one (1) byte.

The sequencing through the state diagram 900 in performing the translation operations performed by the FDDI-to-Ethernet translator 800 to translate the FDDI frame to the 802.3 IPX frame are as follows.

1. Latch: determined length latched, and FC, $DA_1$–$DA_6$, $SA_1$–$SA_6$ latched; byte count=13
2. Pass and Latch: $DA_1$–$DA_6$ and $SA_1$–$SA_6$ output; and SNAP, SNAP, CNTL, OUI[1] latched; byte count=12
3. Decision: C6 is true as SNAP && SNAP && CNTL == $E0E003_{HEX}$
4. 802.3 IPX:
   Output determined length
   Latch OUI[2], OUI[3], Type [$FFFF_{HEX}$ $80F3_{HEX}$]
   Output Type
5. Pass: repeat latching and outputting next four bytes of the frame until FS
6. Idle: Await next frame to be translated Preferably, the buffers 418–424 are implemented by RAM having a bandwidth of 250 Mbps to support FDDI traffic in and out as well as handling for IP fragmentation and station management (SMT) traffic.

When translating from FDDI to Ethernet, incoming FDDI frame may need to be fragmented into a plurality of Ethernet frames. In particular, the FDDI packets can include up to 4352 bytes, whereas the Ethernet frame can include only up to 1512 bytes. The fragmentation process (known as IP fragmentation) is well known, see, e.g., rfc791 Internet Protocol—DARPA Internet Program Protocol Specification, by Information Sciences institute, University of Southern California, September 1981, which is hereby incorporated by reference. In the case of the frame translating switch 300 according to an embodiment of the invention, the microprocessor 308 would be conventionally programmed to check the length of the incoming frame as determined by the buffer manager 304 and stored in the frame store memory 308.

The invention may also be used with a network interconnecting device that includes an uplink module which allows connection to another local network in a manner that allows the size and line lengths of a network to be increased. The uplink module could be coupled to or incorporated in the switch interface or some other network interconnecting device. The uplink module and its utilization are described in detail in "METHOD AND APPARATUS FOR NETWORKING DATA DEVICES USING AN UPLINK MODULE", by Scott, et al., U.S. application Ser. No. 08/403,206 which is hereby incorporated by reference.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A frame translation system for translating a frame associated with a computer network from a first format to a second format, said system comprising:
   a storage buffer for temporarily storing the frame in the first format;
   a counter for counting a length of the frame in the first format; and
   a hardware-based format translator for retrieving portions of the frame in the first format from said storage buffer, identifying the second format from at least one of the retrieved portions of the frame in the first format, and outputting portions of the frame in the second format based on at least one of the length and the retrieved portions of the frame in the first format, wherein hardware circuitry of said format translator is controlled by a state machine, and wherein said format translator has a throughput of greater than about 100k frames/second.

2. A frame translation system as recited in claim 1, wherein said storage buffer stores the frame as well as at least a portion of a next frame, and wherein said frame translation system simultaneously outputs the frame in the second format while storing the next frame in said storage buffer.

3. A frame translation system as recited in claim 1, wherein said frame translator produces the frame in the second format by sequentially outputting the retrieved portions from said storage buffer or the length, and wherein the throughput of said hardware-based format translator is about 100k frames/second.

4. A frame translation system as recited in claim 1, wherein said frame translator produces the frame in the second format by sequentially outputting the retrieved portions from said storage buffer, predetermined portions, or the length.

5. A frame translation system as recited in claim 1, wherein said storage buffer comprises a circular buffer.

6. A frame translation system as recited in claim 1, wherein said format translator comprises:

a first latch for temporarily storing a portion from said storage buffer;

a second latch for temporarily storing a next portion from said storage buffer, the next portion being the next sequential portion from said storage buffer after the portion stored in said first latch;

a length latch for storing the length; and a selector for outputting portions for the frame of the second format, each of the portions being selected from at least one of said first latch, said second latch and said length latch, and wherein said state machine operates to control said first latch, said second latch, said length latch and said selector to cause the frame to be translated from the first format to the second format.

7. A frame translation system for translating a frame associated with a computer network from a first format to a second format, said system comprising:

a storage buffer for temporarily storing the frame in the first format;

a counter for counting a length of the frame in the first format;

a hardware-based format translator for retrieving portions of the frame in the first format from said storage buffer, identifying the second format from at least one of the retrieved portions of the frame in the first format, and outputting portions of the frame in the second format based on at least one of the length and the retrieved portions of the frame in the first format, said format translator includes at least a first latch for temporarily storing a portion from said storage buffer;

a second latch for temporarily storing a next portion from said storage buffer, the next portion being the next sequential portion from said storage buffer after the portion stored in said first latch;

a length latch for storing the length;

a selector for outputting portions for the frame of the second format, each of the portions being selected from at least one of said first latch, said second latch and said length latch;

comparison circuitry for producing comparison information by comparing certain portions stored in said first and second latches to determine the second format for the frame being output; and a state machine programmed into hardware circuitry for controlling said first latch, said second latch, said length latch and said selector in accordance with the comparison information.

8. A frame translation system as recited in claim 7, wherein said state machine includes a plurality of states, said states include:

a latch state for latching the portion and the next portion in said first and second latches, respectively;

a pass and latch state for passing through said format translator a first predetermined number of portions from said first latch;

a decision state for determining from a plurality of potential frame formats the second format for the frame being output using the comparison information;

a conversion state for causing said selector to output at least part of one of the portion, the next portion or the length so as to form the frame in the second format; and a pass state for passing through said format translator a second predetermined number of portions from said first latch.

9. A frame translation system as recited in claim 8, wherein said format translator further comprises a counter for counting a count value indicating the number of portions that have been retrieved from said storage buffer, and wherein said decision state determines the second format using the comparison information and the count value.

10. A frame translation system as recited in claim 1, wherein said frame translation system can translate frames from the first format to the second format at a rate greater than 150k frames/second.

11. A frame translation system for translating a frame associated with a computer network from a first format to a second format, said system comprising:

a storage buffer for temporarily storing the frame in the first format;

a format translator for retrieving portions of the frame in the first format from said storage buffer, identifying the second format from at least one of the retrieved portions of the frame in the first format, and outputting portions of the frame in the second format based on at least one of a predetermined code portion and the retrieved portions of the frame in the first format, hardware circuitry within said format translator being controlled by a state machine.

12. A frame translation system as recited in claim 11, wherein said storage buffer stores the frame as well as at least a portion of a next frame, and wherein said frame translation system simultaneously outputs the frame in the second format while storing the next frame in said storage buffer.

13. A frame translation system as recited in claim 12, wherein said frame translator produces the frame in the second format by sequentially outputting the retrieved portions from said storage buffer or the predetermined code portion.

14. A frame translation system as recited in claim 11, wherein said storage buffer comprises a circular buffer.

15. A frame translation system for translating a frame associated with a computer network from a first format to a second format, said system comprising:
   a storage buffer for temporarily storing the frame in the first format;
   a format translator for retrieving portions of the frame in the first format from said storage buffer, identifying the second format from at least one of the retrieved portions of the frame in the first format, and outputting portions of the frame in the second format based on at least one of a predetermined code portion and the retrieved portions of the frame in the first format, said format translator includes at least
      a first latch for temporarily storing a portion from said storage buffer;
      a second latch for temporarily storing a next portion from said storage buffer, the next portion being the next sequential portion from said storage buffer after the portion stored in said first latch;
      a storage device for storing field codes; and
      a selector for outputting portions for the frame of the second format, each of the portions being selected from said first latch and said storage device.

16. A frame translation system as recited in claim 15, wherein said format translator comprises:
   comparison circuitry for producing comparison information by comparing certain portions stored in said first and second latches to determine the first format of the frame being received; and
   a state machine programmed into hardware circuitry for controlling said first latch, said second latch, and said selector in accordance with the comparison information.

17. A frame translation system as recited in claim 16, wherein said state machine includes a plurality of states, said states include:
   a frame control and latch state for outputting a frame control field from said storage device and for latching the portion and the next portion in said first and second latches, respectively;
   a first pass state for passing through said format translator a first subportion from said first latch;
   a second pass state for passing through said format translator a second subportion from said first latch;
   a third pass state for passing through said format translator a third subportion from said first latch;
   a fourth pass state for passing through said format translator a fourth subportion from said first latch;
   a latch state for latching another portion and another next portion in said first and second latches, respectively;
   a decision state for determining from a plurality of potential frame formats the first format of the frame being received using the comparison information from said comparison circuitry; and
   a conversion state for causing said selector to output at least part of one of the another portion or one of the field codes so as to form the frame in the second format.

18. A frame translation system as recited in claim 17, wherein said format translator further comprises a counter for counting a count value indicating the number of portions that have been retrieved from said storage buffer, and
   wherein said decision state determines the second format using the comparison information and the count value.

19. A frame translation system as recited in claim 11, wherein said frame translation system can translate frames from the first format to the second format at a rate greater than 150k frames/second.

20. A network connection apparatus, comprising:
   an input port for receiving a FDDI frame;
   a FDDI interface controller for controlling receipt of a data stream associated with the FDDI frame, the FDDI frame being one of a control FDDI frame and a data FDDI frame;
   a data storage device having a control buffer portion for storing data associated with at least one control FDDI frame and a data buffer portion for storing data associated with at least one data FDDI frame;
   a buffer manager for managing the storing of data of the FDDI frame to the appropriate one of the control buffer portion and the data buffer portion, determining a length of the FDDI frame, determining whether the data FDDI frame is ready to be dispatched, and dispatching the data FDDI frame from said data buffer after the data FDDI frame is determined to be ready to be dispatched;
   a processor, operatively connected to said data storage device, for processing the control FDDI frame stored in the control buffer portion;
   frame format translator circuitry for translating the data FDDI frame stored in the data buffer portion to an Ethernet type frame; and
   a first output port, operatively connected to said frame format translator circuitry, for outputting the Ethernet type frame.

21. A network connection apparatus as recited in claim 20, wherein said frame format translator circuitry translates the data FDDI frame to a particular one of a plurality of Ethernet type frame formats.

22. A network connection apparatus as recited in claim 21, wherein said frame format translator circuitry retrieves portions of the data FDDI frame from the data buffer portion, identifies the particular one of the plurality of Ethernet type frame formats from at least one of the retrieved portions of the data FDDI frame, and outputs portions of the Ethernet type frame using the length and the retrieved portions of the data FDDI frame.

23. A network connection apparatus as recited in claim 22, wherein said frame format translator circuitry comprises:
   a first latch for temporarily storing a number of portions from said data buffer portion;
   a length latch for storing the length as determined by said buffer manager;
   a selector for outputting portions for the Ethernet type frame, each of the portions being selected from one of said first latch and said length latch; and
   comparison circuitry for producing comparison information by comparing certain portions stored in said first latch with predetermined values to determine the particular Ethernet type frame format for the frame being output.

24. A network connection apparatus as recited in claim 23, wherein said frame format translator circuitry further comprises:
   a portion counter for counting a count number of portions that have been latched into said first latch; and
   a state machine programmed into hardware circuitry for controlling said first latch, said length latch and said selector in accordance with the comparison information and the count number.

25. A network connection apparatus as recited in claim 24, said state machine includes a plurality of states, said states include:
- a latch state for latching a number of the portions in said first latch;
- a pass and latch state for passing through said format translator circuitry a first predetermined number of portions from said first latch;
- a decision state for determining from the Ethernet type frame formats the particular one of the Ethernet type frame formats using the comparison information and the count number;
- a conversion state for causing said selector to output at least one of the portions held in said first latch or the length, or to skip one or more of the portions held in said first latch, so as to form the frame in the particular Ethernet type frame format; and
- a pass state for passing a number of portions from said first latch through said frame format translator circuitry.

26. A network connection apparatus as recited in claim 24, wherein said network connection apparatus is a switch, and
  wherein said network connection apparatus further comprises:
  - a second output port, operatively connected to said frame format translator circuitry, for outputting the Ethernet type frame; and
  - a switch interface for sending at least one of the FDDI frame and the Ethernet type frame to one of said first and second output ports.

27. A network connection apparatus, comprising:
- a first input port for receiving an Ethernet type frame;
- a data storage device for storing data associated with the Ethernet type frame;
- a buffer manager for managing the storing of the Ethernet type frame to said data storage device, determining whether the Ethernet type frame is ready to be dispatched, and dispatching the Ethernet type frame from said data storage device after the Ethernet type frame is determined to be ready to be dispatched;
- frame format translator circuitry for translating the Ethernet type frame to a data FDDI frame;
- a FDDI interface controller for controlling transmission of a data stream associated with the data FDDI frame; and
- an output port for outputting the data FDDI frame.

28. A network connection apparatus as recited in claim 27, wherein said frame format translator circuitry translates from one of a plurality of Ethernet type frame formats to the FDDI frame.

29. A network connection apparatus as recited in claim 28, wherein said frame format translator circuitry retrieves portions of the Ethernet type frame from said data storage device, identifies the particular one of the plurality of Ethernet type frame formats from at least one of the retrieved portions of the Ethernet type frame, and outputs portions of the data FDDI frame using predetermined codes and the retrieved portions of the Ethernet type frame.

30. A network connection apparatus as recited in claim 29, wherein said frame format translator circuitry comprises:
- a first latch for temporarily storing a portion from said buffer;
- a second latch for temporarily storing a next portion from said buffer, the next
- a field code storage device for storing field codes;
- a selector for outputting portions for the FDDI frame, each of the portions being selected from one of said first latch and said storage device; and
- comparison circuitry for producing comparison information by comparing certain portions stored in said first latch with predetermined values to determine the Ethernet type frame format of the frame being received.

31. A network connection apparatus as recited in claim 30, wherein said frame format translator circuitry further comprises:
- a portion counter for counting a count number of portions that have been latched into the first latch; and
- a state machine programmed into hardware circuitry for controlling said first latch, said field code storage device and said selector in accordance with the comparison information and the count number.

32. A network connection apparatus as recited in claim 31, wherein said state machine includes a plurality of states, said states include:
- a frame control and latch state for outputting a field code from said field code storage device and for latching a number of portions in said first latch;
- a first pass state for passing through said format translator circuitry a first portion from said first latch;
- a second pass state for passing through said format translator circuitry a second portion from said first latch;
- a third pass state for passing through said format translator circuitry a third portion from said first latch;
- a fourth pass state for passing through said format translator circuitry a fourth portion from said first latch;
- a latch state for latching a predetermined number of portions in said first latch;
- a decision state for determining a particular one of the Ethernet type frame formats being received using the comparison information from said comparison circuitry and the count number from said portion counter; and
- a conversion state for causing said selector to output at least one of the portions held in said first latch or one of the field codes so as to form the FDDI frame.

33. A network connection apparatus as recited in claim 30, wherein said network connection apparatus is a switch, and
  wherein said network connection apparatus further comprises:
  - a second input port, operatively connected to said frame format translator circuitry, for receiving an Ethernet type frame of a type different from the Ethernet type frame received at said first input port; and
  - a switch interface for directing one of the Ethernet type frame received at said first input port and the Ethernet type frame received at said second input port through said network connection apparatus to said output port.

* * * * *